United States Patent
Chen et al.

(10) Patent No.: US 9,439,124 B2
(45) Date of Patent: Sep. 6, 2016

(54) MOBILITY CONTROL METHOD AND APPARATUS

(71) Applicant: Huawei Technologies Co., Ltd., Shenzhen (CN)

(72) Inventors: Dong Chen, Shanghai (CN); Min Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/616,350

(22) Filed: Feb. 6, 2015

(65) Prior Publication Data

US 2015/0156697 A1   Jun. 4, 2015

Related U.S. Application Data

(63) Continuation of application No. PCT/CN2012/079943, filed on Aug. 10, 2012.

(51) Int. Cl.
*H04W 36/30* (2009.01)
*H04W 36/00* (2009.01)
*H04W 36/04* (2009.01)

(52) U.S. Cl.
CPC ......... *H04W 36/30* (2013.01); *H04W 36/0094* (2013.01); *H04W 36/04* (2013.01)

(58) Field of Classification Search
CPC .................................................. H04W 36/30
See application file for complete search history.

(56) References Cited

U.S. PATENT DOCUMENTS

2010/0048217 A1   2/2010   Deshpande et al.
2010/0317363 A1*  12/2010  Bai ................... H04W 72/0413
                                                           455/452.2
2011/0098042 A1*  4/2011   Mach .................... H04W 48/20
                                                            455/435.1
2011/0151867 A1    6/2011   Hirano et al.

(Continued)

FOREIGN PATENT DOCUMENTS

CN   101815343 A    8/2000
CN   1464644 A      12/2003

(Continued)

OTHER PUBLICATIONS

"3rd Generation Partnership Project; Technical Specification Group Radio Access Network; Radio Resource Control (RRC); Protocol Specification (Release 10)," 3GPP TS 25.331, V10.8.0, Jun. 2012, 1892 pages.

(Continued)

*Primary Examiner* — Michael T Vu
(74) *Attorney, Agent, or Firm* — Slater Matsil, LLP

(57) ABSTRACT

Embodiments of the present invention provide a mobility control method and apparatus. The method includes: receiving a first message sent by a network-side device. The first message includes first information used to indicate a measurement parameter, where the measurement parameter includes an extended-cell individual offset and/or a range extension. The extended-cell individual offset is used for measurement reporting. A range of the extended-cell individual offset is greater than a range of a cell individual offset. The range extension is used for a cell reselection and measurement reporting. The method also includes determining the measurement parameter according to the first information and performing mobility control for the target cell according to measured quality of a target cell and the measurement parameter.

22 Claims, 5 Drawing Sheets

(56) References Cited

U.S. PATENT DOCUMENTS

| | | |
|---|---|---|
| 2011/0244863 A1 | 10/2011 | Matsuo et al. |
| 2011/0281587 A1* | 11/2011 | Jokinen ............ H04W 36/0094 455/437 |
| 2012/0142339 A1* | 6/2012 | Duan .................. H04W 52/38 455/424 |
| 2012/0188884 A1 | 7/2012 | Simonsson et al. |
| 2013/0201914 A1 | 8/2013 | Wang et al. |
| 2013/0215787 A1 | 8/2013 | Jeong et al. |

FOREIGN PATENT DOCUMENTS

| | | |
|---|---|---|
| CN | 1802006 A | 7/2006 |
| CN | 101500218 A | 8/2009 |
| CN | 101646225 A | 2/2010 |
| CN | 101815330 A | 8/2010 |
| CN | 101827412 A | 9/2010 |
| CN | 101895924 A | 11/2010 |
| CN | 101959194 A | 1/2011 |
| CN | 102197682 A | 9/2011 |
| CN | 102378206 A | 3/2012 |
| CN | 102457349 A | 5/2012 |
| CN | 102695201 A | 9/2012 |
| CN | 102917392 A | 2/2013 |
| CN | 102932833 A | 2/2013 |
| CN | 103369583 A | 10/2013 |
| CN | 102318195 B | 4/2014 |
| WO | 2010070854 A1 | 6/2010 |
| WO | 2010130091 A1 | 11/2010 |
| WO | 2011124013 A1 | 10/2011 |
| WO | 2012067467 A2 | 5/2012 |

OTHER PUBLICATIONS

Nokia Siemens Networks, et al, "Aspects of Pico Node Range Extension," 3GPP TSG RAN WG1 #61bis meeting, R1-103824, Dresden, Germany, Jun. 28-Jul. 2, 2010, 5 pages.

Pantech, "Discussions on CRE Bias," 3GPP TSG RAN2 Meeting #73, R2-111293, Taipei, Taiwan, Feb. 21-25, 2011, 4 pages.

* cited by examiner

100

---

Receive a first message sent by a network-side device, where the first message includes first information used to indicate a measurement parameter, where the measurement parameter includes an extended-cell individual offset value and/or a range extension value, where the extended-cell individual offset value is used for measurement reporting, a range of the extended-cell individual offset value is greater than a range of a cell individual offset value, and the range extension value can be used for a cell reselection and measurement reporting ~ S110

Determine the measurement parameter according to the first information ~ S120

Perform mobility control for the target cell according to measured quality of a target cell and the measurement parameter ~ S130

Determine a measurement parameter, where the measurement parameter includes an extended-cell individual offset value and/or a range extension value, where the extended-cell individual offset value is used for measurement reporting, a range of the extended-cell individual offset value is greater than a range of a cell individual offset value, and the range extension value can be used for a cell reselection and measurement reporting ~ S210

Send a first message to the user equipment, where the first message includes first information used to indicate the measurement parameter, so that the user equipment performs mobility control for the target cell according to measured quality of a target cell and the measurement parameter ~ S220

FIG. 2

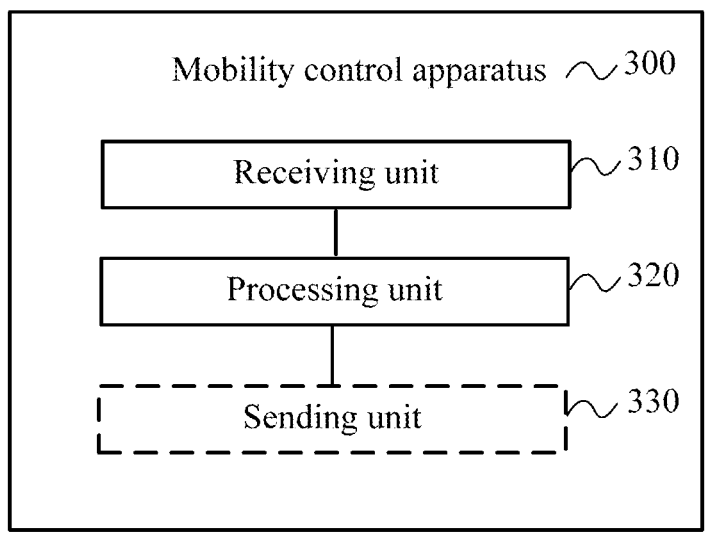

FIG. 3

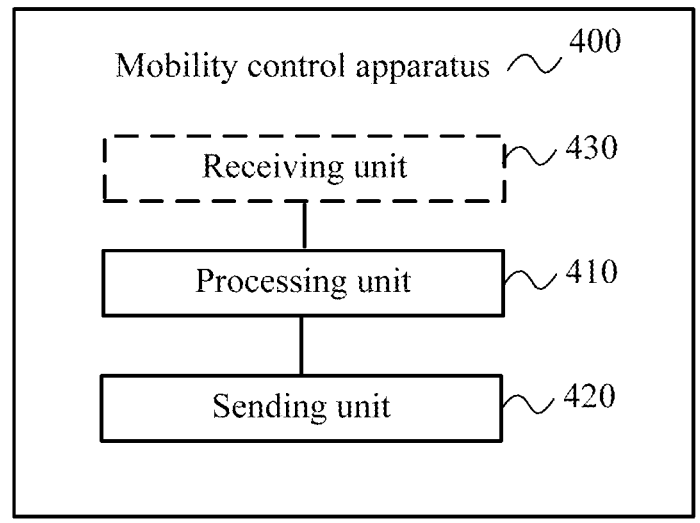

S510: A user equipment determines, according to measured quality of a target cell, an interference reporting event for the target cell, where the interference reporting event includes a first interference event used to indicate that the user equipment enters an area in which the user equipment causes interference to the target cell or a second interference reporting event used to indicate that the user equipment leaves an area causing interference to the target cell S520: Send a fourth message to the network-side device, where the fourth message includes fourth information used to indicate the interference reporting event

Receive a fourth message, which is sent by a user equipment and includes fourth information, where the fourth information is used to indicate an interference reporting event for a target cell, where the interference reporting event includes a first interference event used to indicate that the user equipment enters an area in which the user equipment causes interference to the target cell or a second interference reporting event used to indicate that the user equipment leaves an area causing interference to the target cell ~S610

Perform interference control for the target cell according to the interference reporting event ~S620

FIG. 6

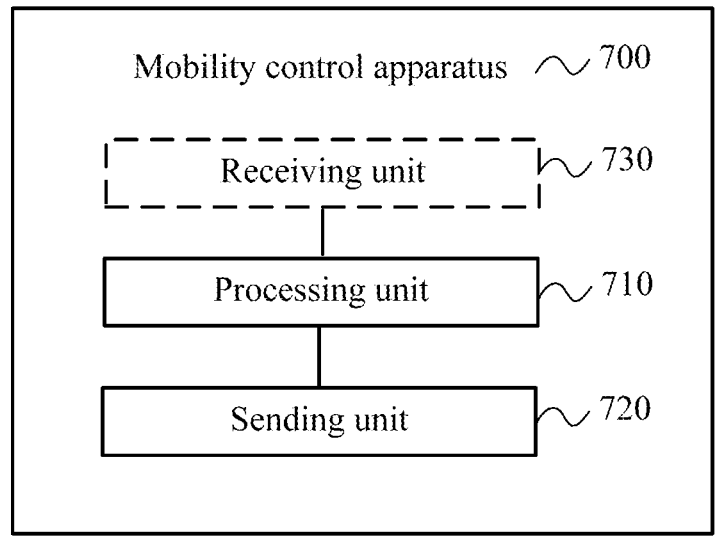

FIG. 7

MOBILITY CONTROL METHOD AND APPARATUS

This application is a continuation of International Application No. PCT/CN2012/079943, filed on Aug. 10, 2012, which is hereby incorporated by reference in its entirety.

TECHNICAL FIELD

The present invention relates to the field of communications, and in particular, to a mobility control method and apparatus.

BACKGROUND

With the development of mobile communications technologies, user requirements are increasingly high. By introducing small cells into an existing macro network, a heterogeneous network (Hetnet) is formed, where, in a case in which a throughput rate of each cell remains unchanged, a system capacity may be doubled (or even increased by ten times).

Currently, when a reselection or handover is performed between a macro cell and a small cell, a user equipment (UE) needs to measure cell (pilot) signal quality, and meanwhile, a network-side device configures an offset for a neighboring cell, so that the UE evaluates, based on a sum of (or a difference between) the cell signal quality and the offset, whether the neighboring cell meets a reselection criterion or a reporting threshold. During the cell reselection, a cell reselection quality offset parameter (Qoffset) is used, and during measurement reporting, a cell individual offset is used (CIO).

After a small cell is deployed, it is expected that coverage of the small cell can be extended. That is, using a UE being located in the macro cell as an example, it is expected that the UE can easily choose to report a mobility-related event such as an event 1a to a network-side device or trigger such reporting, so that more UEs communicate through the small cell, so as to implement service offload for the macro cell. However, currently, a difference between transmit power of a small cell base station and transmit power of a macro cell base station is excessively large, and a range of the currently used CIO already cannot meet a requirement for extending the small cell.

SUMMARY

Embodiments of the present invention provide a mobility control method, which can extend coverage of a small cell.

According to a first aspect, a mobility control method is provided, where the method includes: receiving a first message sent by a network-side device, where the first message includes first information used to indicate a measurement parameter, where the measurement parameter includes an extended-cell individual offset (E-CIO) and/or a range extension (RE), where the E-CIO is used for measurement reporting, a range of the E-CIO is greater than a range of a cell individual offset (CIO), and the RE can be used for a cell reselection and measurement reporting; determining the measurement parameter according to the first information; and performing mobility control for the target cell according to measured quality of a target cell and the measurement parameter.

In a first possible implementation manner, before the first information sent by the network-side device is received, the method further includes: sending a second message to the network-side device, where the second message includes second information used to indicate a measurement capability of a user equipment, so that the network-side device determines the measurement parameter according to the measurement capability of the user equipment.

With reference to the first aspect or the first possible implementation manner, in a second possible implementation manner, the first message further includes cell indication information used to indicate the target cell, and the performing mobility control for the target cell according to measured quality of a target cell and the measurement parameter, includes: determining the target cell according to the cell indication information; and performing mobility control for the target cell according to the measured quality of the target cell and the measurement parameter.

With reference to the first aspect, the first possible implementation manner, or the second possible implementation manner, in a third possible implementation manner, the performing mobility control for the target cell according to measured quality of a target cell and the measurement parameter, includes: determining a reporting event for the target cell according to the measured quality of the target cell and the measurement parameter; and sending a third message to the network-side device, where the third message includes third information used to indicate the reporting event.

With reference to the first aspect, the first possible implementation manner, the second possible implementation manner, or the third possible implementation manner, in a fourth possible implementation manner, the determining a reporting event for the target cell according to the measured quality of the target cell and the measurement parameter includes: determining an interference reporting event for the target cell according to the measured quality of the target cell and the measurement parameter, so that the network-side device performs interference control for the target cell according to the interference reporting event.

With reference to the first aspect, the first possible implementation manner, the second possible implementation manner, the third possible implementation manner, or the fourth possible implementation manner, in a fifth possible implementation manner, the first message further includes a first identifier, where the first identifier is used to indicate that the measurement parameter is used to determine the interference reporting event; and the determining a reporting event for the target cell according to the measured quality of the target cell and the measurement parameter specifically includes: determining the interference reporting event according to the first identifier, the measured quality of the target cell, and the measurement parameter.

With reference to the first aspect, the first possible implementation manner, the second possible implementation manner, the third possible implementation manner, the fourth possible implementation manner, or the fifth possible implementation manner, in a sixth possible implementation manner, the third message further includes a second identifier, where the second identifier is used to indicate that the reporting event is the interference reporting event, so that the network-side device performs interference control for the target cell according to the second identifier and the reporting event.

According to a second aspect, a mobility control method is provided, where the method includes: determining a measurement parameter, where the measurement parameter includes an extended-cell individual offset (E-CIO) and/or a range extension (RE), where the E-CIO is used for measurement reporting, a range of the E-CIO is greater than a range of a cell individual offset (CIO), and the RE can be used for a cell reselection and measurement reporting; and sending a first message to a user equipment, where the first message includes first information used to indicate the measurement parameter, so that the user equipment performs mobility control for the target cell according to measured quality of a target cell and the measurement parameter.

In a first possible implementation manner, before the determining a measurement parameter, the method further includes: receiving a second message sent by the user equipment, where the second message includes second information used to indicate a measurement capability of the user equipment; and the determining a measurement parameter includes: determining the measurement parameter according to the measurement capability of the user equipment.

With reference to the second aspect or the first possible implementation manner, in a second possible implementation manner, the determining a measurement parameter includes: determining, according to the target cell, a measurement parameter corresponding to the target cell; and the sending a first message to a user equipment includes: sending the first message to the user equipment, where the first message further includes cell indication information used to indicate the target cell, so that the user equipment determines the target cell according to the cell indication information.

With reference to the second aspect, the first possible implementation manner, or the second possible implementation manner, in a third possible implementation manner, the method further includes: receiving a third message, which is sent by the user equipment and includes third information, where the third information is used to indicate a reporting event for the target cell, where the reporting event is determined by the user equipment according to the measured quality of the target cell and the measurement parameter; and performing mobility control for the target cell according to the reporting event.

With reference to the second aspect, the first possible implementation manner, the second possible implementation manner, or the third possible implementation manner, in a fourth possible implementation manner, the performing mobility control for the target cell according to the reporting event includes: performing interference control for the target cell according to an interference reporting event included in the reporting event.

With reference to the second aspect, the first possible implementation manner, the second possible implementation manner, the third possible implementation manner, or the fourth possible implementation manner, in a fifth possible implementation manner, the sending a first message to a user equipment includes: sending the first message to the user equipment, where the first message further includes a first identifier, where the first identifier is used to indicate that the measurement parameter is used to determine the interference reporting event; the receiving a third message, which is sent by the user equipment and includes third information, includes: receiving the third message, which is sent by the user equipment and includes the third information, where the third information is used to indicate the interference reporting event; and the performing mobility control for the target cell according to the reporting event includes: determining the interference reporting event according to the third information; and performing interference control for the target cell according to the interference reporting event.

With reference to the second aspect, the first possible implementation manner, the second possible implementation manner, the third possible implementation manner, the fourth possible implementation manner, or the fifth possible implementation manner, in a sixth possible implementation manner, the receiving a third message, which is sent by the user equipment and includes third information, includes: receiving the third message, which is sent by the user equipment and includes the third information, where the third message further includes a second identifier, where the second identifier is used to indicate that the reporting event is the interference reporting event; and the performing mobility control for the target cell according to the reporting event includes: determining, according to the second identifier, that the reporting event is the interference reporting event; and performing interference control for the target cell according to the interference reporting event.

According to a third aspect, a mobility control apparatus is provided, where the apparatus includes: a receiver, configured to receive a first message sent by a network-side device, and transmit first information, which is included in the first message and used to indicate a measurement parameter, to a processor, where the measurement parameter includes an extended-cell individual offset (E-CIO) and/or a range extension (RE), where the E-CIO is used for measurement reporting, a range of the E-CIO is greater than a range of a cell individual offset (CIO), and the RE can be used for a cell reselection and measurement reporting; and the processor, configured to acquire the first information from the receiver, and determine the measurement parameter according to the first information; and configured to perform mobility control for the target cell according to measured quality of a target cell and the measurement parameter.

In a first possible implementation manner, the apparatus further includes: a transmitter, configured to send a second message to the network-side device, where the second message includes second information used to indicate a measurement capability of a user equipment, so that the network-side device determines the measurement parameter according to the measurement capability of the user equipment.

With reference to the third aspect or the first possible implementation manner, in a second possible implementation manner, the first message received by the receiver further includes cell indication information used to indicate the target cell; and the processor is further configured to determine the target cell according to the cell indication information; and configured to perform mobility control for the target cell according to the measured quality of the target cell and the measurement parameter.

With reference to the third aspect, the first possible implementation manner, or the second possible implementation manner, in a third possible implementation manner, the processor is specifically configured to determine a reporting event for the target cell according to the measured quality of the target cell and the measurement parameter, and transmit third information indicating the reporting event, to the transmitter; and the apparatus further includes: the transmitter, configured to acquire the third information from the processor, and send a third message to the network-side device, where the third message includes the third information, so that the network-side device performs mobility control for the target cell according to the third information.

With reference to the third aspect, the first possible implementation manner, the second possible implementation manner, or the third possible implementation manner, in a fourth possible implementation manner, the processor is specifically configured to determine an interference reporting event for the target cell according to the measured quality of the target cell and the measurement parameter, where the interference reporting event is used for the network-side device to perform interference control for the target cell.

With reference to the third aspect, the first possible implementation manner, the second possible implementation manner, the third possible implementation manner, or the fourth possible implementation manner, in a fifth possible implementation manner, the first message received by the receiver further includes a first identifier, where the first identifier is used to indicate that the measurement parameter is used to determine the interference reporting event; and the processor is specifically configured to determine the interference reporting event according to the first identifier, the measured quality of the target cell, and the measurement parameter.

With reference to the third aspect, the first possible implementation manner, the second possible implementation manner, the third possible implementation manner, the fourth possible implementation manner, or the fifth possible implementation manner, in a sixth possible implementation manner, the third message sent by the transmitter further includes a second identifier, where the second identifier is used to indicate that the reporting event is the interference reporting event, so that the network-side device performs interference control for the target cell according to the second identifier and the reporting event.

According to a fourth aspect, a mobility control apparatus is provided, where the apparatus includes: a processor, configured to determine a measurement parameter, and transmit first information used to indicate the measurement parameter, to a transmitter, where the measurement parameter includes an extended-cell individual offset (E-CIO) and/or a range extension (RE), where the E-CIO is used for measurement reporting, a range of the E-CIO is greater than a range of a cell individual offset (CIO), and the RE can be used for a cell reselection and measurement reporting; and the transmitter, configured to send a first message to a user equipment, where the first message includes the first information, so that the user equipment performs mobility control for the target cell according to measured quality of a target cell and the measurement parameter.

In a first possible implementation manner, the apparatus further includes: a receiver, configured to receive a second message sent by the user equipment, where the second message includes second information used to indicate a measurement capability of the user equipment, and transmit the second information to the processor; and the processor is further configured to determine the measurement parameter according to the measurement capability of the user equipment.

With reference to the first aspect or the first possible implementation manner, in a second possible implementation manner, the processor is specifically configured to determine, according to the target cell, a measurement parameter corresponding to the target cell; and the transmitter is specifically configured to send the first message to the user equipment, where the first message further includes cell indication information used to indicate the target cell, so that the user equipment determines the target cell according to the cell indication information.

With reference to the fourth aspect, the first possible implementation manner, or the second possible implementation manner, in a third possible implementation manner, the apparatus further includes: the receiver, configured to receive a third message, which is sent by the user equipment and includes third information, where the third information is used to indicate a reporting event for the target cell, where the reporting event is determined by the user equipment according to the measured quality of the target cell and the measurement parameter, and transmit the third information to the processor; and the processor is specifically configured to perform mobility control for the target cell according to the reporting event.

With reference to the fourth aspect, the first possible implementation manner, the second possible implementation manner, or the third possible implementation manner, in a fourth possible implementation manner, the processor is specifically configured to perform interference control for the target cell according to an interference reporting event included in the reporting event.

With reference to the fourth aspect, the first possible implementation manner, the second possible implementation manner, the third possible implementation manner, or the fourth possible implementation manner, in a fifth possible implementation manner, the transmitter is specifically configured to send the first message to the user equipment, where the first message further includes a first identifier, where the first identifier is used to indicate that the measurement parameter is used to determine the interference reporting event; the receiver is further configured to receive the third message, which is sent by the user equipment and includes the third information, where the third information is used to indicate the interference reporting event; and the processor is further configured to perform interference control for the target cell according to the interference reporting event.

With reference to the fourth aspect, the first possible implementation manner, the second possible implementation manner, the third possible implementation manner, the fourth possible implementation manner, or the fifth possible implementation manner, in a sixth possible implementation manner, the receiver is further configured to receive the third message, which is sent by the user equipment and includes the third information, where the third message further includes a second identifier, where the second identifier is used to indicate that the reporting event is the interference reporting event; and the processor is further configured to determine, according to the second identifier, that the reporting event is the interference reporting event; and configured to perform interference control for the target cell according to the interference reporting event.

With the mobility control method and apparatus according to the embodiments of the present invention, a network-side device configures a measurement parameter including an E-CIO and/or an RE for a user equipment, and the user equipment determines a reporting event for a neighboring small cell according to the E-CIO with a greater range than a CIO, or the user equipment determines a reporting event for a neighboring small cell according to a CIO and the RE, or the user equipment determines a reporting event for a neighboring small cell according to the E-CIO and the RE. Therefore, a requirement for extending a small cell can be met.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodi- FIG. 1 is a schematic flowchart of a mobility control method according to an embodiment of the present invention;

FIG. 2 is a schematic flowchart of a mobility control method according to another embodiment of the present invention;

FIG. 3 is a schematic block diagram of a mobility control apparatus according to an embodiment of the present invention;

FIG. 4 is a schematic block diagram of a mobility control apparatus according to another embodiment of the present invention;

FIG. 5 is a schematic flowchart of a mobility control method according to still another embodiment of the present invention;

FIG. 6 is a schematic flowchart of a mobility control method according to still another embodiment of the present invention;

FIG. 7 is a schematic block diagram of a mobility control apparatus according to still another embodiment of the present invention.

DETAILED DESCRIPTION OF ILLUSTRATIVE EMBODIMENTS

Figure 8:
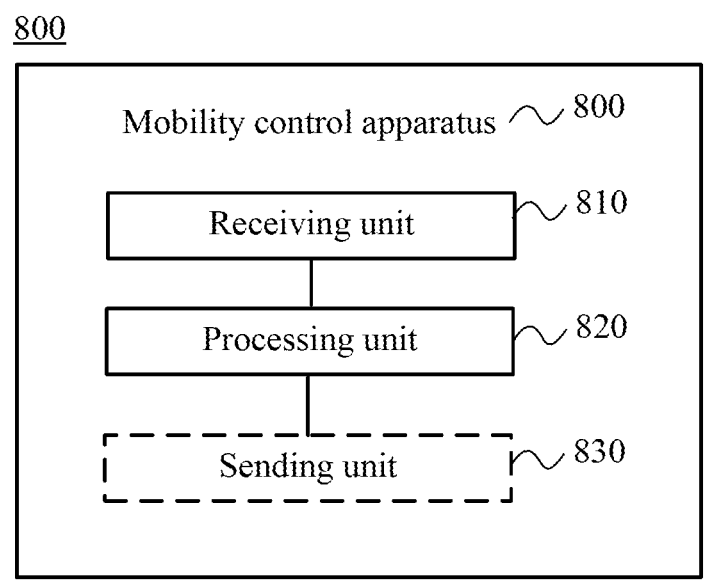
FIG. 8 is a schematic block diagram of a mobility control apparatus according to still another embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM), a Code Division Multiple Access (CDMA) system, a Wideband Code Division Multiple Access (WCDMA) system, a general packet radio service (GPRS) system, and a Long Term Evolution (LTE) system.

A user equipment (UE), also referred to as a mobile terminal, a mobile user equipment, and the like, may communicate with one or more core networks through a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or vehicle-mounted mobile apparatus, which exchanges voice and/or data with the radio access network.

A device on the network side may be a macro cell base station controller (RNC) or a macro cell base station (NodeB), may also be a base station (BTS) in the GSM or CDMA, may also be a base station (NodeB) in the WCDMA, and may further be an evolved NodeB (eNB or e-NodeB) in the LTE, which is not limited in the present invention.

A device on the network side may be a small cell base station, may also be a Micro, may also be a Pico, and may further be a home base station, and may also be referred to as a femto or an access point (AP), which is not limited in the present invention.

FIG. 1 shows a schematic flowchart of a mobility control method 100 according to an embodiment of the present invention, which is described from a perspective of a user equipment. As shown in FIG. 1, the method 100 includes:

S110. Receive a first message sent by a network-side device, where the first message includes first information used to indicate a measurement parameter, where the measurement parameter includes an extended-cell individual offset (E-CIO) and/or a range extension (RE), where the E-CIO is used for measurement reporting, a range of the E-CIO is greater than a range of a cell individual offset (CIO), and the RE can be used for a cell reselection and measurement reporting.

S120. Determine the measurement parameter according to the first information.

S130. Perform mobility control for a target cell according to measured quality of the target cell and the measurement parameter.

In this embodiment of the present invention, a user equipment may be located in a macro cell, so that control is performed for a neighboring small cell according to the measurement parameter (used for only a small cell, and referred to as a first measurement parameter for ease of description hereinafter) delivered by the network-side device (a network-side device providing the macro cell (for example, an RNC), which is referred to as a macro-cell network-side device for ease of description hereinafter) (namely, case 1), or a user equipment may be located in a small cell, so that control is performed for a neighboring macro cell according to the measurement parameter (used for only a macro cell, and referred to as a second measurement parameter for ease of description hereinafter) delivered by the network-side device (a network-side device providing the small cell, referred to as a small-cell network-side device for ease of description hereinafter) (namely, case 2). The following separately describes control processes in different cases.

Case 1

The macro-cell network-side device may predetermine a first measurement parameter only for a neighboring small cell (including a target cell), so that after measuring (pilot) signal quality of a target neighboring small cell and determining measured quality, the UE determines determined quality for the target neighboring small cell according to the measured quality and the first measurement parameter, where the determined quality is a parameter used when the UE determines a reporting event for the neighboring small cell or determines whether to reselect or hand over to the neighboring small cell. It should be noted that in this embodiment of the present invention, "only for a neighboring small cell" indicates that the first measurement parameter can be used only for determining determined quality of the neighboring small cell, but cannot be used for determining determined quality of a neighboring macro cell. The following omits descriptions of same or similar cases.

Optionally, in this embodiment of the present invention, before the first information sent by the network-side device is received, the method further includes sending a second message to the network-side device, where the second message includes second information used to indicate a measurement capability of a user equipment, so that the network-side device determines the measurement parameter according to the measurement capability of the user equipment.

Specifically, in this embodiment of the present invention, the UE may report a detection capability of the UE to the macro-cell network-side device. For example, the detection capability may indicate a capability of detecting a weak cell signal by the UE. Currently it is specified that signal strength of a common pilot channel (CPICH Echo, Common Pilot Channel Echo) that can be detected by the UE should be higher than −20 dB. In this embodiment of the present invention, the detection capability indicates that the UE can detect a cell pilot signal whose signal strength is lower than −20 dB. Therefore, for example, if transmit power of the target small cell is lower than minimum transmit power that the UE can detect, that is, the UE cannot detect the target small cell, the macro-cell network-side device may not configure the first measurement parameter for the target small cell; if transmit power of the target small cell is higher than or equal to minimum transmit power that the UE can detect, the macro-cell network-side device may configure the first measurement parameter for the target small cell.

As an example instead of a limitation, in the example of this embodiment of the present invention, the second message may include: a cell update (CELL UPDATE) message, an initial direct transfer (INITIAL DIRECT TRANSFER) message, an RRC connection request (RRC CONNECTION REQUEST) message, an RRC connection setup complete (RRC CONNECTION SETUP COMPLETE) message, UE capability information (UE CAPABILITY INFORMATION), inter RAT handover information (INTER RAT HANDOVER INFO), and so on. The following omits descriptions of same or similar cases.

In this embodiment of the present invention, to make it easy for the UE to access the target neighboring small cell, the macro-cell network-side device may set a first measurement parameter used in different control cases for the target neighboring small cell.

Specifically, the first measurement parameter may include the E-CIO and/or the RE. For example, when transmit power of the neighboring small cell is low, the macro-cell network-side device may configure a large first measurement parameter for the neighboring small cell. For example, in this embodiment of the present invention, the range of the E-CIO may be −30 dB to 30 dB, and a range of the RE may be −20 dB to 20 dB. Therefore, the determined quality determined by the UE for the neighboring small cell easily reaches a threshold of a reporting event (for example, an event 1a, 1b, or 1d), or it is easy for the UE to reselect or hand over to the neighboring small cell (for example, the determined quality easily becomes the highest quality in candidate cells). That the UE performs mobility control for the target cell according to the first quality parameter, is later described in detail. It should be understood that the foregoing exemplified case is only for exemplary description of the present invention, and the present invention is not limited thereto.

In addition, in this embodiment of the present invention, the macro-cell network-side device may configure a uniform first measurement parameter for all neighboring small cells, that is, the target small cell includes all the neighboring small cells. Alternatively, the macro-cell network-side device may separately configure a first measurement parameter for a neighboring small cell. In this case, information indicating the first measurement parameter (first information) may carry an indication identifier (cell indication information) corresponding to the neighboring small cell, so that the UE may determine, according to the indication identifier, a small cell (target small cell) that can be controlled by using the first measurement parameter. Alternatively, the macro-cell network-side device may configure a same first measurement parameter for at least two neighboring small cells in all neighboring small cells. In this case, information indicating the first measurement parameter (first information) may carry an indication identifier (cell indication information) corresponding to the at least two neighboring small cells, so that the UE may determine, according to the indication identifier, a small cell (target small cell) that can be controlled by using the first measurement parameter.

Afterward, the macro-cell network-side device may send the information indicating the first measurement parameter (first information), to the UE by using, for example, system information (an example of the first message) and/or a measurement control message (another example of the first message).

In S110a, the UE receives the first information, and in S120a, the UE may extract the first measurement parameter from the first information.

Because the macro-cell network-side device configures, based on a cell scrambling code, a measurement parameter for a small cell, when several small cells use a same scrambling code, the UE cannot determine a specific small cell for which a corresponding measurement parameter is used.

Therefore, optionally, in this embodiment of the present invention, the first message further includes cell indication information used to indicate the target cell. The performing mobility control for the target cell according to measured quality of a target cell and the measurement parameter, includes determining the target cell according to the cell indication information; and performing mobility control for the target cell according to the measured quality of the target cell and the measurement parameter.

Specifically, as described above, if the first measurement parameter configured by the macro-cell network-side device is corresponding to only one or more neighboring small cells (not applicable to all neighboring small cells), the information indicating the first measurement parameter (first information) carries an indication identifier (cell indication information) corresponding to the one or more neighboring small cells. Therefore, the UE may determine, according to the cell indication information, a neighboring small cell (target small cell) that can be controlled by using the first measurement parameter.

Optionally, in this embodiment of the present invention, the cell indication information includes location information used to indicate a location of the target cell, or transmit power information used to indicate transmit power of the target cell, or time difference information used to indicate a time difference between the target cell and a cell in which the user equipment is currently located.

Specifically, in a communications system of the present invention, it may be required that time differences between different small cells and a same macro cell should be set to be different; the macro-cell network-side device may indicate the target small cell according to a time difference. Therefore, the UE may distinguish the target small cell according to time difference information indicating the time difference. Alternatively, measurement parameters of different small cells may be distinguished by using different location information or transmit power of the small cells. Herein, the location information of the small cell may be determined by determining detected signal quality of the macro cell, or determined by using GPS information. It should be understood that the foregoing exemplified parameters are only for exemplary description of the present invention, and the present invention is not limited thereto;

other parameters that can uniquely indicate the target small cell all fall within the protection scope of the present invention.

Therefore, with the mobility control method according to this embodiment of the present invention, a problem that a measurement parameter cannot be accurately applied due to reuse of a scrambling code can be avoided.

The following Table 1 shows an example of delivering time difference information to indicate a target cell.

TABLE 1

| Primary common pilot channel information | | |
|---|---|---|
| Small cell parameter list | 1 to <maxpico> | |
| RE value | | Real(−20 . . . −20 by step of 0.5) |
| E-CIO value | | Real(−30 . . . 30 by step of 0.5) |
| Time difference | | |

The RE value for each small cell may be different, but a same E-CIO value may be configured for several small cells, that is, the following Table 2 shows another example of delivering time difference information to indicate a target cell.

TABLE 2

| Primary common pilot channel information | | Primary CPICH info 10.3.6.60 |
|---|---|---|
| E-CIO value | | Real(−30 . . . 30 by step of 0.5) |
| Small cell parameter list | 1 to <maxPico> | |
| RE value | | Real(−20 . . . −20 by step of 0.5) |
| Time difference | | |

After the first measurement parameter for the target small cell is determined, in S130a, the UE may perform control for the target small cell according to the first measurement parameter.

Optionally, in this embodiment of the present invention, the performing mobility control for the target cell according to measured quality of a target cell and the measurement parameter, includes: determining a reporting event for the target cell according to the measured quality of the target cell and the measurement parameter; and sending a third message to the network-side device, where the third message includes third information used to indicate the reporting event.

Specifically, in this embodiment of the present invention, in S130a, the UE may evaluate, based on a sum of (or a difference between) the signal quality of the neighboring small cell and the first measurement parameter, whether the neighboring small cell meets a threshold of a measurement reporting event. Herein, the measurement reporting event may include: an event 1a, indicating that pilot quality of a cell (herein referring to a neighboring small cell) reaches a reporting threshold (herein referring to reporting to the macro-cell network-side device), and mainly used for the macro-cell network-side device to add the cell to an active set of the UE; an event 1b, indicating that pilot quality of a cell (herein referring to a neighboring small cell) reaches a reporting threshold (herein referring to reporting to the macro-cell network-side device), and mainly used for the macro-cell network-side device to delete the cell from the active set of the UE; an event 1d, indicating that a cell (herein referring to a neighboring small cell) becomes a cell having the best pilot quality among cells detected by the UE, and mainly used for triggering the macro-cell network-side device to hand over the UE to the neighboring small cell (namely, a hard handover). It should be understood that the foregoing exemplified reporting event for the neighboring small cell is only for exemplary description and the present invention is not limited thereto; other mobility-related measurement reporting events all fall within the protection scope of the present invention.

As an example instead of a limitation, in an example of the present invention, the third message may include: a measurement report message. The following omits descriptions of same or similar cases.

In addition, in this embodiment of the present invention, the first measurement parameter may include the E-CIO (namely, case A), or the first measurement parameter may include the RE (namely, case B), or the first measurement parameter may include the E-CIO and RE (namely, case C). The following separately describes a specific control process of the UE in each case.

Case A

Optionally, the determining a reporting event for the target cell according to the measured quality of the target cell and the measurement parameter includes determining a first reporting event for the target cell according to the measured quality of the target cell and the E-CIO.

In addition, the determining a reporting event for the target cell according to the measured quality of the target cell and the measurement parameter includes if a sum of the measured quality of the target cell and the extended-cell individual offset reaches a reporting threshold of an event 1a, determining that the reporting event is the event 1a.

Specifically, for example, after the UE measures quality (Mp) of the neighboring small cell, the UE determines whether Mp+E-CIO meets the threshold of the event 1a (an example of the first reporting event), where the E-CIO may be greater than the CIO; and if the Mp+E-CIO reaches the reporting threshold of the event 1a, reports the event 1a for the neighboring small cell to the network-side device. It should be noted that in this embodiment of the present invention, the reporting threshold of the event 1a may be effective on both the small cell and macro cell, therefore, causing no impact on determining the related event of the neighboring macro cell. In addition, because the E-CIO is greater than the CIO, compared with the prior art, it is easier for the UE to report the event 1a for the neighboring small cell to the network-side device. Therefore, an effect of extending the coverage of the small cell can be achieved. Furthermore, because the E-CIO is only used to determine an event for the small cell, no impact on determining the related event of the neighboring macro cell is caused.

In addition, the determining a reporting event for the target cell according to the measured quality of the target cell and the measurement parameter includes: if a sum of the measured quality of the target cell and the extended-cell individual offset leaves a reporting threshold of an event 1b, determining that the reporting event is the event 1b.

For another example, after the UE measures quality of the neighboring small cell, the UE determines whether Mp+E-CIO meets the threshold of the event 1b (another example of the first reporting event), where the E-CIO may be greater than the CIO; and if the Mp+E-CIO leaves the reporting threshold of the event 1b, reports the event 1b for the neighboring small cell to the network-side device. It should be noted that in this embodiment of the present invention, the reporting threshold of the event 1b may be effective on both the small cell and macro cell, therefore, causing no impact on determining the related event of the neighboring macro cell. In addition, because the E-CIO is greater than the CIO, compared with the prior art, it is more difficult for the UE to report the event 1b for the neighboring small cell to the network-side device. Therefore, an effect of extending the coverage of the small cell can be achieved. Furthermore, because the E-CIO is only used to determine an event for the small cell, no impact on determining the related event of the neighboring macro cell is caused.

Case B

Optionally, the determining a reporting event for the target cell according to the measured quality of the target cell and the measurement parameter includes: determining a second reporting event for the target cell according to the measured quality of the target cell and the RE; or determining a third reporting event for the target cell according to the measured quality of the target cell, the RE, and the CIO.

In addition, the determining a reporting event for the target cell according to the measured quality of the target cell and the measurement parameter includes: if a sum of the measured quality of the target cell and the range extension reaches a reporting threshold of 1d, determining that the reporting event is the event 1d.

Specifically, for example, after the UE measures quality of the neighboring small cell, the UE determines whether Mp+RE meets the threshold of the event 1d (an example of the second reporting event), where the network-side device may make the RE greater than the CIO when configuring the RE; and if the Mp+RE reaches the reporting threshold of the event 1d, reports the event 1d for the neighboring small cell to the network-side device. It should be noted that in this embodiment of the present invention, the reporting threshold of the event 1d may be effective on both the small cell and macro cell, therefore, causing no impact on determining the related event of the neighboring macro cell. In addition, because the RE is greater than the CIO, compared with the prior art, it is easier for the UE to report the event 1d for the neighboring small cell to the network-side device. Therefore, an effect that it is easier for the UE to hand over to the neighboring small cell can be achieved. Furthermore, because the RE is only used to determine an event for the small cell, no impact on determining the related event of the neighboring macro cell is caused.

For another example, after the UE measures quality of the neighboring small cell, the UE determines whether Mp+RE+CIO meets the threshold of the event 1a (an example of the third reporting event); and if the Mp+RE+CIO reaches the reporting threshold of the event 1a, reports the event 1a for the neighboring small cell to the network-side device. It should be noted that in this embodiment of the present invention, the reporting threshold of the event 1a may be effective on both the small cell and macro cell, therefore, causing no impact on determining the related event of the neighboring macro cell. In addition, because the Mp+RE+CIO is obviously greater than the Mp+CIO, compared with the prior art, it is easier for the UE to report the event 1a for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

For another example, after the UE measures quality of the neighboring small cell, the UE determines whether Mp+RE+CIO meets the threshold of the event 1b; and if the Mp+RE+CIO reaches the reporting threshold of the event 1b, reports the event 1b for the neighboring small cell to the network-side device. It should be noted that in this embodiment of the present invention, the reporting threshold of the event 1b may be effective on both the small cell and macro cell, therefore, causing no impact on determining the related event of the neighboring macro cell. In addition, because the Mp+RE+CIO is obviously greater than the Mp+CIO, compared with the prior art, it is more difficult for the UE to report the event 1b for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

Case C

Optionally, the determining a reporting event for the target cell according to the measured quality of the target cell and the measurement parameter includes: determining a fourth reporting event for the target cell according to the measured quality of the target cell, the RE, and the E-CIO.

Specifically, for example, after the UE measures quality of the neighboring small cell, the UE determines whether Mp+RE+E-CIO meets the threshold of the event 1d (an example of the fourth reporting event), where the E-CIO is greater than the CIO; and if the Mp+RE+E-CIO reaches the reporting threshold of the event 1d, reports the event 1d for the neighboring small cell to the network-side device. It should be noted that in this embodiment of the present invention, the reporting threshold of the event 1d may be effective on both the small cell and macro cell, therefore, causing no impact on determining the related event of the neighboring macro cell. In addition, because the E-CIO is greater than the CIO, compared with the prior art, it is easier for the UE to report the event 1d for the neighboring small cell to the network-side device. Therefore, an effect that it is easier for the UE to hand over to the neighboring small cell can be achieved. Furthermore, because the RE is only used to determine an event for the small cell, no impact on determining the related event of the neighboring macro cell is caused.

In addition, the determining a reporting event for the target cell according to the measured quality of the target cell and the measurement parameter includes: if a sum of the measured quality of the target cell, the extended-cell individual offset, and the range extension reaches the reporting threshold of the event 1a, determining that the reporting event is the event 1a.

For another example, after the UE measures quality of the neighboring small cell, the UE determines whether Mp+RE+E-CIO meets the threshold of the event 1a (an example of the fourth reporting event), where the E-CIO is greater than the CIO; and if the Mp+RE+E-CIO reaches the reporting threshold of the event 1a, reports the event 1a for the neighboring small cell to the network-side device. It should be noted that in this embodiment of the present invention, the reporting threshold of the event 1a may be effective on both the small cell and macro cell, therefore, causing no impact on determining the related event of the neighboring macro cell. In addition, because the Mp+RE+E-CIO is obviously greater than the Mp+CIO, compared with the prior art, it is easier for the UE to report the event 1a for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

In addition, the determining a reporting event for the target cell according to the measured quality of the target cell and the measurement parameter includes: if a sum of the measured quality of the target cell, the extended-cell individual offset, and the range extension reaches the reporting threshold of the event 1b, determining that the reporting event is the event 1b.

For another example, after the UE measures quality of the neighboring small cell, the UE determines whether Mp+RE+E-CIO meets the threshold of the event 1b, where the E-CIO is greater than the CIO; and if the Mp+RE+E-CIO reaches the reporting threshold of the event 1b, reports the event 1b for the neighboring small cell to the network-side device. It should be noted that in this embodiment of the present invention, the reporting threshold of the event 1b may be effective on both the small cell and macro cell, therefore, causing no impact on determining the related event of the neighboring macro cell. In addition, because the Mp+RE+E-CIO is obviously greater than the Mp+CIO, compared with the prior art, it is more difficult for the UE to report the event 1b for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

In this embodiment of the present invention, the method for controlling the neighboring small cell by the macro-cell network-side device according to the reporting event is the same as that in the prior art, and its description is omitted herein for avoiding repetition.

In conclusion, with the mobility control method according to this embodiment of the present invention, a network-side device configures a measurement parameter including an E-CIO and/or an RE for a user equipment, and the user equipment determines a reporting event for a neighboring small cell according to an E-CIO with a greater range than a CIO, or the user equipment determines a reporting event for a neighboring small cell according to a CIO and a RE, or the user equipment determines a reporting event for a neighboring small cell according to an E-CIO and a RE. Therefore, coverage of a small cell can be extended effectively.

It should be understood that in this embodiment of the present invention, "mobility control" may include various types of control performed by using the reporting event of measurement reporting, which is not particularly limited by the present invention.

In this embodiment of the present invention, the small cell and the macro cell may be deployed at a same frequency or different frequencies. When the small cell and the macro cell are deployed at a same frequency, because coverage of the macro cell may overlap coverage of the small cell, a co-channel interference problem may occur. That is, when the UE accessing a macro cell approaches but does not reach an area for a soft handover to the small cell, because a path loss from the UE to the macro-cell network-side device is obviously greater than a path loss from the UE to the small-cell network-side device, the UE causes uplink interference to the small cell, and therefore an uplink capacity of the small cell is reduced. In this embodiment of the present invention, transmit power of the small-cell network-side device is obviously lower than that of the macro-cell network-side device, and the UE triggers, by detecting downlink cell signal quality, behaviors such as joining the active set or performing a handover.

Therefore, optionally, in this embodiment of the present invention, the determining a reporting event for the target cell according to the measured quality of the target cell and the measurement parameter includes: determining an interference reporting event for the target cell according to the measured quality of the target cell and the measurement parameter, so that the network-side device performs interference control for the target cell according to the interference reporting event.

Specifically, in this embodiment of the present invention, the interference reporting event may be added to indicate to the network-side device that the UE enters an area in which the UE causes interference to the small cell, and therefore, the network-side device may perform interference control for the small cell in time. In this embodiment of the present invention, control used to reduce interference for the neighboring small cell is the same as that in the prior art, and its description is omitted herein for avoiding repetition.

Optionally, in this embodiment of the present invention, the first message further includes a first identifier, where the first identifier is used to indicate that the measurement parameter is used to determine the interference reporting event; and the determining a reporting event for the target cell according to the measured quality of the target cell and the measurement parameter specifically includes: determining the interference reporting event according to the first identifier, the measured quality of the target cell, and the measurement parameter.

Specifically, for example, in this embodiment of the present invention, an event and a threshold in the prior art may be used, and the event 1a (an example of the interference reporting event) is reported to indicate that the UE enters an uplink interference area, or the event 1b (another example of the interference reporting event) is reported to indicate that the UE leaves an uplink interference area. That is, when delivering a measurement parameter to the UE, the macro-cell network-side device may deliver an identifier (first identifier) used to indicate that the measurement parameter is used to determine an interference reporting event. Therefore, both the UE and the macro-cell network-side device may explicitly know that the event 1a reported by the UE is used to indicate that the UE enters an area in which the UE causes interference to the neighboring small cell, and that the event 1b is used to indicate that the UE leaves an area in which the UE causes interference to the neighboring small cell. Therefore, the macro-cell network-side device may perform, according to the event 1a or event 1b reported by the UE, control to reduce interference for the neighboring small cell. In this embodiment of the present invention, the control used to reduce interference for the neighboring small cell is the same as that in the prior art, and its description is omitted herein for avoiding repetition.

Alternatively, in this embodiment of the present invention, a new event and threshold may be used, and an event 1x (an example of the interference reporting event) is reported to indicate that the UE enters an uplink interference area, or an event 1y (another example of the interference reporting event) is reported to indicate that the UE leaves an uplink interference area. That is, when delivering a measurement parameter to the UE, the macro-cell network-side device may deliver an identifier (first identifier) used to indicate that the measurement parameter is used to determine an interference reporting event. Therefore, both the UE and the macro-cell network-side device may explicitly know that the event 1x reported by the UE is used to indicate that the UE enters an area in which the UE causes interference to the neighboring small cell, and that the event 1y is used to indicate that the UE leaves an area in which the UE causes interference to the neighboring small cell. Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

Optionally, in this embodiment of the present invention, the third message further includes a second identifier, where the second identifier is used to indicate that the reporting event is the interference reporting event, so that the network-side device performs interference control for the target cell according to the second identifier and the reporting event.

Specifically, for example, in this embodiment of the present invention, an event and a threshold in the prior art may be used, and the event 1a (an example of the interference reporting event) is reported to indicate that the UE enters an uplink interference area, or the event 1b (another example of the interference reporting event) is reported to indicate that the UE leaves an uplink interference area. That is, when the UE reports the event 1a or 1b to the macro-cell network-side device, the UE may report an identifier (second identifier) used to indicate that the reporting event is an interference reporting event, to the macro-cell network-side device. Therefore, both the UE and the macro-cell network-side device may explicitly know that the event 1a reported by the UE is used to indicate that the UE enters an area in which the UE causes interference to the neighboring small cell, and that the event 1b is used to indicate that the UE leaves an area in which the UE causes interference to the neighboring small cell. Therefore, the macro-cell network-side device may perform, according to the event 1a or event 1b reported by the UE, control to reduce interference for the neighboring small cell. In this embodiment of the present invention, the control used to reduce interference for the neighboring small cell is the same as that in the prior art, and its description is omitted herein for avoiding repetition.

Alternatively, a new event and threshold may be used, and an event 1x (an example of the interference reporting event) is reported to indicate that the UE enters an uplink interference area, or an event 1y (another example of the interference reporting event) is reported to indicate that the UE leaves an uplink interference area. That is, when the UE reports the event 1a or 1b to the macro-cell network-side device, the UE may report an identifier (second identifier) used to indicate that the reporting event is an interference reporting event, to the macro-cell network-side device. Therefore, both the UE and the macro-cell network-side device may explicitly know that the event 1x reported by the UE is used to indicate that the UE enters an area in which the UE causes interference to the neighboring small cell, and that the event 1y is used to indicate that the UE leaves an area in which the UE causes interference to the neighboring small cell. Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

In conclusion, with the mobility control method according to this embodiment of the present invention, by using the measurement parameter, the uplink interference can be detected before the UE enters the area in which the UE causes interference to the neighboring small cell, and subsequent interference control is started, which can avoid interference to the neighboring small cell.

In the prior art, different offsets are used separately during a reselection and measurement reporting, which is therefore complicated for configuration of the network-side device and parsing of the UE, and furthermore, one parameter must also be modified when another parameter is modified according to a requirement. In view of the foregoing technical problem, in this embodiment of the present invention, optionally, the performing mobility control for the target cell according to measured quality of a target cell and the measurement parameter, includes: determining, according to the measured quality of the target cell and the RE, that a reselection can be made to the target cell, and performing a reselection operation for the target cell.

Specifically, in S130a, the UE may further perform a reselection or handover operation for the target cell according to the measurement parameter. That is, after the UE measures quality of the neighboring small cell, the UE determines whether Mp+RE is the highest quality in cell quality that can be measured; and if yes, triggers a cell reselection process for the neighboring small cell. The cell reselection process of this embodiment of the present invention is the same as that in the prior art, and its description is omitted herein for avoiding repetition. In this embodiment of the present invention, because an offset (RE) used for the cell reselection is the same as an offset (RE) used for determining the reporting event, for ease of configuration, it is unnecessary to simultaneously modify parameters used for the cell reselection and measurement control in the prior art.

With the mobility control method according to this embodiment of the present invention, the RE is uniformly used when a reporting event for the target cell is determined and when the cell reselection operation is performed for the target cell, which can facilitate configuration of the network-side device and parsing of the UE and facilitate parameter modification.

Case 2

The small-cell network-side device configures a second measurement parameter only for a neighboring macro cell, so that after measuring (pilot) signal quality of a target neighboring macro cell and determining measured quality, the UE determines determined quality for the target neighboring macro cell according to the measured quality and the second measurement parameter, where the determined quality is a parameter used when the UE determines a reporting event for the neighboring macro cell or determines whether to reselect or hand over to the neighboring macro cell. It should be noted that in this embodiment of the present invention, "only for a neighboring macro cell" indicates that the second measurement parameter can be used only for determining determined quality of the neighboring macro cell, but cannot be used for determining determined quality of a neighboring small cell. In addition, the small-cell network-side device may configure the second measurement parameter according to the first measurement parameter (a measurement parameter configured by the macro-cell network-side device for the small cell); therefore, when the UE is in the macro cell, it is easier for the UE to select or report the small cell; when the UE is in the small cell corresponding to the macro cell, it is easier for the UE to camp on the small cell, or more difficult to report the corresponding macro cell, thereby avoiding a ping-pong handover problem. Specifically, the measurement parameter of the macro cell may be set to a negative value, or a reporting threshold of a corresponding event may be increased to achieve the foregoing objective.

In this embodiment of the present invention, a process of receiving and acquiring, by the UE in S110b and S120b, a second measurement parameter parameter set by the small-cell network-side device for the target neighboring macro cell, is the same as or similar to the process in S110a and S120a in case 1, and its description is omitted herein for avoiding repetition.

In S130b, the UE may evaluate, based on a sum of (or a difference between) the signal quality of the neighboring macro cell and the measurement parameter, whether the neighboring macro cell meets a threshold of a measurement reporting event. Herein, the measurement reporting event may include: an event 1a, indicating that pilot quality of a cell (herein referring to a neighboring macro cell) reaches a reporting threshold (herein referring to reporting to the macro-cell network-side device), and mainly used for the macro-cell network-side device to add the cell to an active set; an event 1b, indicating that pilot quality of a cell (herein referring to a neighboring macro cell) reaches a reporting threshold (herein referring to reporting to the macro-cell network-side device), and mainly used for the macro-cell network-side device to delete the cell from the active set; an event 1d, indicating that a cell (herein referring to a neighboring macro cell) becomes a cell having the best pilot quality among cells detected by the UE, and mainly used for triggering the macro-cell network-side device to control a handover of the UE to the neighboring macro cell (namely, a soft handover). It should be understood that the foregoing exemplified reporting event for the neighboring macro cell is only for exemplary description and the present invention is not limited thereto; other mobility-related measurement reporting events all fall within the protection scope of the present invention.

In addition, in this embodiment of the present invention, the second measurement parameter may include the E-CIO (namely, case D), or the second measurement parameter may include the RE (namely, case E), or the second measurement parameter may include the E-CIO and RE (namely, case F). The following separately describes a specific control process of the UE in each case.

Case D

For example, after the UE measures quality (Mp) of the neighboring macro cell, the UE determines whether Mp+E-CIO meets the threshold of the event 1a (an example of the first reporting event), where the network-side device may make the E-CIO less than the CIO when configuring the E-CIO; and if the Mp+E-CIO reaches the reporting threshold of the event 1a, reports the event 1a for the neighboring macro cell to the network-side device. Because the E-CIO is less than the CIO, compared with the prior art, it is more difficult for the UE to report the event 1a for the neighboring macro cell to the network-side device. Therefore, an effect of narrowing the coverage of the macro cell can be achieved. Furthermore, because the E-CIO is only used to determine an event for the macro cell, no impact on determining the related event of the neighboring small cell is caused.

For another example, after the UE measures quality of the neighboring macro cell, the UE determines whether Mp+E-CIO meets the threshold of the event 1b (another example of the first reporting event), where the network-side device may make the E-CIO less than the CIO when configuring the E-CIO; and if the Mp+E-CIO reaches the reporting threshold of the event 1b, reports the event 1b for the neighboring macro cell to the network-side device. Because the E-CIO is less than the CIO, compared with the prior art, it is easier for the UE to report the event 1b for the neighboring macro cell to the network-side device. Therefore, an effect of narrowing the coverage of the macro cell can be achieved. Furthermore, because the E-CIO is only used to determine an event for the small cell, no impact on determining the related event of the neighboring macro cell is caused.

Case E

For example, after the UE measures quality of the neighboring macro cell, the UE determines whether Mp+RE meets the threshold of the event 1d (an example of the second reporting event), where the network-side device may set the RE to a negative value when configuring the RE; and if the Mp+RE reaches the reporting threshold of the event 1d, reports the event 1d for the neighboring macro cell to the network-side device. Because the RE is less than the CIO, compared with the prior art, it is more difficult for the UE to report the event 1d for the neighboring macro cell to the network-side device. Therefore, an effect that it is more difficult for the UE to hand over to the neighboring macro cell can be achieved. Furthermore, because the RE is only used to determine an event for the macro cell, no impact on determining the related event of the neighboring small cell is caused.

For another example, after the UE measures quality of the neighboring macro cell, the UE determines whether Mp+RE+CIO meets the threshold of the event 1a (an example of the third reporting event), where the network-side device may set the RE to a negative value when configuring the RE; and if the Mp+RE+CIO reaches the reporting threshold of the event 1a, reports the event 1a for the neighboring macro cell to the network-side device. Because the Mp+RE+CIO is obviously less than the Mp+CIO, compared with the prior art, it is more difficult for the UE to report the event 1a for the neighboring macro cell to the network-side device. Therefore, an effect of narrowing the coverage of the macro cell can be achieved. Furthermore, because the RE is only used to determine an event for the macro cell, no impact on determining the related event of the neighboring small cell is caused.

For another example, after the UE measures quality of the neighboring macro cell, the UE determines whether Mp+RE+CIO meets the threshold of the event 1b, where the network-side device may set the RE to a negative value when configuring the RE; and if the Mp+RE+CIO reaches the reporting threshold of the event 1b, reports the event 1b for the neighboring macro cell to the network-side device. Because the Mp+RE+CIO is obviously less than the Mp+CIO, compared with the prior art, it is easier for the UE to report the event 1b for the neighboring macro cell to the network-side device. Therefore, an effect of narrowing the coverage of the macro cell can be achieved. Furthermore, because the RE is only used to determine an event for the macro cell, no impact on determining the related event of the neighboring small cell is caused.

Case F

For example, after the UE measures quality of the neighboring macro cell, the UE determines whether Mp+RE+E-CIO meets the threshold of the event 1d (an example of the fourth reporting event), where the network-side device may set the RE to a negative value and/or set the E-CIO less than the CIO when configuring the RE and E-CIO; and if the Mp+RE+E-CIO reaches the reporting threshold of the event 1d, reports the event 1d for the neighboring macro cell to the network-side device. Because the E-CIO is less than the CIO, compared with the prior art, it is more difficult for the UE to report the event 1d for the neighboring macro cell to the network-side device. Therefore, an effect that it is more difficult for the UE to hand over to the neighboring macro cell can be achieved. Furthermore, because the RE is only used to determine an event for the macro cell, no impact on determining the related event of the neighboring small cell is caused.

For another example, after the UE measures quality of the neighboring macro cell, the UE determines whether Mp+RE+E-CIO meets the threshold of the event 1a (an example of the fourth reporting event), where the network-side device may set the RE to a negative value and/or set the E-CIO less than the CIO when configuring the RE and E-CIO; and if the Mp+RE+E-CIO reaches the reporting threshold of the event 1a, reports the event 1a for the neighboring macro cell to the network-side device. Because the Mp+RE+E-CIO is obviously less than the Mp+CIO, compared with the prior art, it is more difficult for the UE to report the event 1a for the neighboring macro cell to the network-side device. Therefore, an effect of narrowing the coverage of the macro cell can be achieved. Furthermore, because the RE is only used to determine an event for the macro cell, no impact on determining the related event of the neighboring small cell is caused.

For another example, after the UE measures quality of the neighboring macro cell, the UE determines whether Mp+RE+E-CIO meets the threshold of the event 1b, where the network-side device may set the RE to a negative value and/or set the E-CIO less than the CIO when configuring the RE and E-CIO; and if the Mp+RE+E-CIO reaches the reporting threshold of the event 1b, reports the event 1b for the neighboring macro cell to the network-side device. Because the Mp+RE+E-CIO is obviously less than the Mp+CIO, compared with the prior art, it is easier for the UE to report the event 1b for the neighboring macro cell to the network-side device. Therefore, an effect of narrowing the coverage of the macro cell can be achieved. Furthermore, because the RE is only used to determine an event for the macro cell, no impact on determining the related event of the neighboring small cell is caused.

In this embodiment of the present invention, the method for controlling the neighboring macro cell by the small-cell network-side device according to the reporting event is the same as that in the prior art, and its description is omitted herein for avoiding repetition.

In conclusion, with the mobility control method according to this embodiment of the present invention, a network-side device configures a measurement parameter including an E-CIO and/or an RE for a user equipment, and the user equipment determines a reporting event for a neighboring macro cell according to the E-CIO with a greater range than a CIO, or the user equipment determines a reporting event for a neighboring macro cell according to a CIO and the RE, or the user equipment determines a reporting event for a neighboring macro cell according to the E-CIO and the RE. Therefore, coverage of a macro cell can be narrowed effectively, and occurrence of a ping-pong handover is avoided.

In this embodiment of the present invention, the small cell and the macro cell may be deployed at a same frequency or different frequencies. When the small cell and the macro cell are deployed at a same frequency, because network coverage of the macro cell may overlap coverage of the small cell, a co-channel interference problem may occur. That is, when the UE accessing a small cell approaches but does not reach an area for a soft handover to the macro cell, because a path loss from the UE to the small-cell network-side device is obviously greater than a path loss from the UE to the macro-cell network-side device, the UE causes uplink interference to the macro cell, and therefore an uplink capacity of the macro cell is reduced. In this embodiment of the present invention, transmit power of the small-cell network-side device is obviously lower than that of the macro-cell network-side device, and the UE triggers, by detecting downlink cell signal quality, behaviors such as joining the active set or performing a handover.

Therefore, optionally, in this embodiment of the present invention, the determining a reporting event for the target cell according to the measured quality of the target cell and the measurement parameter includes: determining an interference reporting event for the target cell according to the measured quality of the target cell and the measurement parameter, so that the network-side device performs interference control for the target cell according to the interference reporting event.

Specifically, in this embodiment of the present invention, the interference reporting event may be added to indicate to the network-side device that the UE enters an area in which the UE causes interference to the macro cell, and therefore, the network-side device may perform interference control for the macro cell in time. In this embodiment of the present invention, control used to reduce interference for the neighboring macro cell is the same as that in the prior art, and its description is omitted herein for avoiding repetition.

In the prior art, different offsets are used separately during a reselection and measurement reporting, which is therefore complicated for configuration of the network-side device and parsing of the UE, and furthermore, one parameter must also be modified when another parameter is modified according to a requirement. In view of the foregoing technical problem, in this embodiment of the present invention, optionally, the performing mobility control for the target cell according to measured quality of a target cell and the measurement parameter, includes: determining, according to the measured quality of the target cell and the RE, that a reselection can be made to the target cell, and performing a reselection operation for the target cell.

With the mobility control method according to this embodiment of the present invention, the RE is uniformly used when a reporting event for the target cell is determined and when the cell reselection or handover operation is performed for the target cell, which can facilitate configuration of the network-side device and parsing of the UE and facilitate parameter modification.

FIG. 2 shows a schematic flowchart of a mobility control method 200 according to an embodiment of the present invention, which is described from a perspective of a network-side device. As shown in FIG. 2, the method 200 includes:

S210. Determine a measurement parameter, where the measurement parameter includes an E-CIO and/or a RE, where the E-CIO is used for measurement reporting, a range of the E-CIO is greater than a range of a CIO, and the RE can be used for a cell reselection and measurement reporting.

S220. Send a first message to a user equipment, where the first message includes first information used to indicate the measurement parameter, so that the user equipment performs mobility control for the target cell according to measured quality of a target cell and the measurement parameter.

In this embodiment of the present invention, the network-side device may be a network-side device providing a macro cell, and the user equipment may be located in the macro cell, so that control is performed for a neighboring small cell according to a measurement parameter (used for only a small cell, and referred to as a first measurement parameter for ease of description hereinafter) delivered by the macro-cell network-side device (namely, case 3), or the network-side device may be a network-side device providing a small cell, and the user equipment may be located in the small cell, so that control is performed for a neighboring macro cell according to a measurement parameter (used for only a macro cell, and referred to as a second measurement parameter for ease of description hereinafter) delivered by a small-cell network-side device (namely, case 4). The following separately describes control processes in different cases.

Case 3

In S210a, the macro-cell network-side device may predetermine a first measurement parameter only for a neighboring small cell, so that after measuring (pilot) signal quality of a target neighboring small cell and determining measured quality, the UE determines determined quality for the target neighboring small cell according to the measured quality and the first measurement parameter, where the determined quality is a parameter used when the UE determines a reporting event for the neighboring small cell or determines whether to reselect or hand over to the neighboring small cell. It should be noted that in this embodiment of the present invention, "only for a neighboring small cell" indicates that the first measurement parameter can be used only for determining determined quality of the neighboring small cell, but cannot be used for determining determined quality of a neighboring macro cell. The following omits descriptions of same or similar cases.

Optionally, in this embodiment of the present invention, before the determining a measurement parameter, the method further includes: receiving a second message sent by the user equipment, where the second message includes second information used to indicate a measurement capability of the user equipment. The determining a measurement parameter includes: determining the measurement parameter according to the measurement capability of the user equipment.

Specifically, in this embodiment of the present invention, the UE may report a detection capability of the UE to the macro-cell network-side device. For example, the detection capability may indicate a capability of detecting a weak cell signal by the UE. Currently it is specified that a cell pilot signal CPICH Ec/Io that can be detected by the UE should be higher than −20 dB. In this embodiment of the present invention, the detection capability indicates that the UE can detect a cell pilot signal whose signal strength is lower than −20 dB. Therefore, for example, if transmit power of the target small cell is lower than minimum transmit power that the UE can detect, that is, the UE cannot detect the target small cell, then the macro-cell network-side device may not configure the first measurement parameter for the target small cell; if transmit power of the target small cell is higher than or equal to minimum transmit power that the UE can detect, the macro-cell network-side device may configure the first measurement parameter for the target small cell.

As an example instead of a limitation, in the example of this embodiment of the present invention, the second message may include: a cell update message, an initial direct transfer message, an RRC connection request message, an RRC connection setup complete message, UE capability information, inter RAT handover information, and so on. The following omits descriptions of same or similar cases.

In this embodiment of the present invention, to make it easy for the UE to access the target neighboring small cell, the macro-cell network-side device may set a first measurement parameter used in different control cases for the target neighboring small cell.

Specifically, the first quality parameter may include the E-CIO and/or the RE. For example, when transmit power of the neighboring small cell is low, the macro-cell network-side device may configure a large first measurement parameter for the neighboring small cell. For example, in this embodiment of the present invention, the range of the E-CIO may be −30 dB to 30 dB, and a range of the RE may be −20 dB to 20 dB. Therefore, the determined quality determined by the UE for the neighboring small cell easily reaches a threshold of a reporting event (for example, an event 1a, 1b, or 1d), or it is easy for the UE to reselect or hand over to the neighboring small cell (for example, the determined quality easily becomes the highest quality in candidate cells). That the UE performs mobility control for the target cell according to the first quality parameter, is later described in detail. It should be understood that the foregoing exemplified case is only for exemplary description of the present invention, and the present invention is not limited thereto.

In addition, in this embodiment of the present invention, the macro-cell network-side device may configure a uniform first measurement parameter for all neighboring small cells, that is, the target small cell is all the neighboring small cells. Alternatively, the macro-cell network-side device may separately configure a first measurement parameter for a neighboring small cell. In this case, information indicating the first measurement parameter (first information) may carry an indication identifier (cell indication information) corresponding to the neighboring small cell, so that the UE may determine, according to the indication identifier, a small cell (target small cell) that can be controlled by using the first measurement parameter. Alternatively, the macro-cell network-side device may configure a same first measurement parameter for at least two neighboring small cells in all neighboring small cells. In this case, information indicating the first measurement parameter (first information) may carry an indication identifier (cell indication information) corresponding to the at least two neighboring small cells, so that the UE may determine, according to the indication identifier, a small cell (target small cell) that can be controlled by using the first measurement parameter.

Afterward, in S220a, the macro-cell network-side device may send the information indicating the first measurement parameter (first information), to the UE by using, for example, system information (an example of the first message) and/or a measurement control message (another example of the first message).

The UE receives the first information, and may extract the first measurement parameter from the first information.

Because the macro-cell network-side device configures, based on a cell scrambling code, a measurement parameter for a small cell, when several small cells use a same scrambling code, the UE cannot determine a specific small cell for which a corresponding measurement parameter is used.

Therefore, optionally, in this embodiment of the present invention, the determining a measurement parameter includes: determining, according to the target cell, a measurement parameter corresponding to the target cell. The sending a first message to a user equipment includes: sending the first message to the user equipment, where the first message further includes cell indication information used to indicate the target cell, so that the user equipment determines the target cell according to the cell indication information.

Specifically, as described above, if the first measurement parameter configured by the macro-cell network-side device is corresponding to only one or more neighboring small cells (not applicable to all neighboring small cells), the information indicating the first measurement parameter (first information) carries an indication identifier (cell indication information) corresponding to the one or more neighboring small cells. Therefore, the UE may determine, according to the cell indication information, a neighboring small cell (target small cell) that can be controlled by using the first measurement parameter.

Optionally, in this embodiment of the present invention, the cell indication information includes location information used to indicate a location of the target cell, or transmit power information used to indicate transmit power of the target cell, or time difference information used to indicate a time difference between the target cell and a cell in which the user equipment is currently located.

Specifically, in a communications system of the present invention, it may be required that time differences between small cells and a same macro cell should set to be different; the macro-cell network-side device may indicate the target small cell according to a time difference. Therefore, the UE may distinguish the target small cell according to time difference information indicating the time difference. Alternatively, measurement parameters of different small cells may be distinguished by using different location information or transmit power of the small cells. Herein, the location information of the small cell may be determined by determining detected signal quality of the macro cell, or determined by using GPS information. It should be understood that the foregoing exemplified parameters are only for exemplary description of the present invention, and the present invention is not limited thereto; other parameters that can uniquely indicate the target small cell all fall within the protection scope of the present invention.

Therefore, with the mobility control method according to this embodiment of the present invention, a problem that a measurement parameter cannot be accurately applied due to reuse of a scrambling code can be avoided.

After the first measurement parameter for the target small cell is determined, the UE may perform control for the target small cell according to the first measurement parameter.

Optionally, in this embodiment of the present invention, the method further includes: receiving a third message, which is sent by the user equipment and includes third information, where the third information is used to indicate a reporting event for the target cell, where the reporting event is determined by the user equipment according to the measured quality of the target cell and the measurement parameter; and performing mobility control for the target cell according to the reporting event.

Specifically, in this embodiment of the present invention, the UE may evaluate, based on a sum of (or a difference between) the signal quality of the neighboring small cell and the first measurement parameter, whether the neighboring small cell meets a threshold of a measurement reporting event. Herein, the measurement reporting event may include: an event 1a (event1 a), indicating that pilot quality of a cell (herein referring to a neighboring small cell) reaches a reporting threshold (herein referring to reporting to the macro-cell network-side device), and mainly used for the macro-cell network-side device to add the cell to an active set; an event 1b (event1 b), indicating that pilot quality of a cell (herein referring to a neighboring small cell) reaches a reporting threshold (herein referring to reporting to the macro-cell network-side device), and mainly used for the macro-cell network-side device to delete the cell from the active set; and an event 1d (event1 d), indicating that a cell (herein referring to a neighboring small cell) becomes a cell having the best pilot quality among cells detected by the UE, and mainly used for triggering the macro-cell network-side device to control a handover of the UE to the neighboring small cell (namely, a soft handover). It should be understood that the foregoing exemplified reporting event for the neighboring small cell is only for exemplary description and the present invention is not limited thereto; other mobility-related measurement reporting events all fall within the protection scope of the present invention.

Optionally, the measurement parameter includes the extended-cell individual offset E-CIO and/or the range extension RE, where the range of the E-CIO is greater than the range of the cell individual offset CIO. That is, in this embodiment of the present invention, the first measurement parameter may include the E-CIO (namely, case G), or the first measurement parameter may include the RE (namely, case H), or the first measurement parameter may include the E-CIO and RE (namely, case I). The following separately describes a specific control process of the UE in each case.

Case G

Specifically, for example, after the UE measures quality of the neighboring small cell, the UE determines whether Mp+E-CIO meets the threshold of the event 1a (an example of the first reporting event), where the network-side device may make the E-CIO greater than the CIO when configuring the E-CIO; and if the Mp+E-CIO reaches the reporting threshold of the event 1a, reports the event 1a for the neighboring small cell to the network-side device. It should be noted that in this embodiment of the present invention, the reporting threshold of the event 1a may be effective on both the small cell and macro cell, therefore, causing no impact on determining the related event of the neighboring macro cell. In addition, because the E-CIO is greater than the CIO, compared with the prior art, it is easier for the UE to report the event 1a for the neighboring small cell to the network-side device. Therefore, an effect of extending the coverage of the small cell can be achieved. Furthermore, because the E-CIO is only used to determine an event for the small cell, no impact on determining the related event of the neighboring macro cell is caused.

For another example, after the UE measures quality of the neighboring small cell, the UE determines whether Mp+E-CIO meets the threshold of the event 1b (another example of the first reporting event), where the network-side device may make the E-CIO greater than the CIO when configuring the E-CIO; and if the Mp+E-CIO reaches the reporting threshold of the event 1b, reports the event 1b for the neighboring small cell to the network-side device. It should be noted that in this embodiment of the present invention, the reporting threshold of the event 1b may be effective on both the small cell and macro cell, therefore, causing no impact on determining the related event of the neighboring macro cell. In addition, because the E-CIO is greater than the CIO, compared with the prior art, it is more difficult for the UE to report the event 1b for the neighboring small cell to the network-side device. Therefore, an effect of extending the coverage of the small cell can be achieved. Furthermore, because the E-CIO is only used to determine an event for the small cell, no impact on determining the related event of the neighboring macro cell is caused.

Case H

Specifically, for example, after the UE measures quality of the neighboring small cell, the UE determines whether Mp+RE meets the threshold of the event 1d (an example of the second reporting event), where the network-side device may make the RE greater than the CIO when configuring the RE; and if the Mp+RE reaches the reporting threshold of the event 1d, reports the event 1d for the neighboring small cell to the network-side device. It should be noted that in this embodiment of the present invention, the reporting threshold of the event 1d may be effective on both the small cell and macro cell, therefore, causing no impact on determining the related event of the neighboring macro cell. In addition, because the RE is greater than the CIO, compared with the prior art, it is easier for the UE to report the event 1d for the neighboring small cell to the network-side device. Therefore, an effect that it is easier for the UE to hand over to the neighboring small cell can be achieved. Furthermore, because the RE is only used to determine an event for the small cell, no impact on determining the related event of the neighboring macro cell is caused.

For another example, after the UE measures quality of the neighboring small cell, the UE determines whether Mp+RE+CIO meets the threshold of the event 1a (an example of the third reporting event), where the network-side device may set the RE to a positive value when configuring the RE; and if the Mp+RE+CIO reaches the reporting threshold of the event 1a, reports the event 1a for the neighboring small cell to the network-side device. It should be noted that in this embodiment of the present invention, the reporting threshold of the event 1a may be effective on both the small cell and macro cell, therefore, causing no impact on determining the related event of the neighboring macro cell. In addition, because the Mp+RE+CIO is obviously greater than the Mp+CIO, compared with the prior art, it is easier for the UE to report the event 1a for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

For another example, after the UE measures quality of the neighboring small cell, the UE determines whether Mp+RE+CIO meets the threshold of the event 1b, where the network-side device may set the RE to a positive value when configuring the RE; and if the Mp+RE+CIO reaches the reporting threshold of the event 1b, reports the event 1b for the neighboring small cell to the network-side device. It should be noted that in this embodiment of the present invention, the reporting threshold of the event 1b may be effective on both the small cell and macro cell, therefore, causing no impact on determining the related event of the neighboring macro cell. In addition, because the Mp+RE+CIO is obviously greater than the Mp+CIO, compared with the prior art, it is more difficult for the UE to report the event 1b for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

Case I

Specifically, for example, after the UE measures quality of the neighboring small cell, the UE determines whether Mp+RE+E-CIO meets the threshold of the event 1d (an example of the fourth reporting event), where the network-side device may set the UE to a positive value and/or set the E-CIO greater than the CIO when configuring the RE and E-CIO; and if the Mp+RE+E-CIO reaches the reporting threshold of the event 1d, reports the event 1d for the neighboring small cell to the network-side device. It should be noted that in this embodiment of the present invention, the reporting threshold of the event 1d may be effective on both the small cell and macro cell, therefore, causing no impact on determining the related event of the neighboring macro cell; in addition, because the Mp+RE+E-CIO is obviously greater than the Mp+CIO, compared with the prior art, it is easier for the UE to report the event 1d for the neighboring small cell to the network-side device. Therefore, an effect that it is easier for the UE to hand over to the neighboring small cell can be achieved. Furthermore, because the RE is only used to determine an event for the small cell, no impact on determining the related event of the neighboring macro cell is caused.

For another example, after the UE measures quality of the neighboring small cell, the UE determines whether Mp+RE+E-CIO meets the threshold of the event 1a (an example of the fourth reporting event), where the network-side device may set the UE to a positive value and/or set the E-CIO greater than the CIO when configuring the RE and E-CIO; and if the Mp+RE+E-CIO reaches the reporting threshold of the event 1a, reports the event 1a for the neighboring small cell to the network-side device. It should be noted that in this embodiment of the present invention, the reporting threshold of the event 1a may be effective on both the small cell and macro cell, therefore, causing no impact on determining the related event of the neighboring macro cell. In addition, because the Mp+RE+E-CIO is obviously greater than the Mp+CIO, compared with the prior art, it is easier for the UE to report the event 1a for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

For another example, after the UE measures quality of the neighboring small cell, the UE determines whether Mp+RE+E-CIO meets the threshold of the event 1b, where the network-side device may set the UE to a positive value and/or set the E-CIO greater than the CIO when configuring the RE and E-CIO; and if the Mp+RE+E-CIO reaches the reporting threshold of the event 1b, reports the event 1b for the neighboring small cell to the network-side device. It should be noted that in this embodiment of the present invention, the reporting threshold of the event 1b may be effective on both the small cell and macro cell, therefore, causing no impact on determining the related event of the neighboring macro cell. In addition, because the Mp+RE+E-CIO is obviously greater than the Mp+CIO, compared with the prior art, it is more difficult for the UE to report the event 1b for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

In this embodiment of the present invention, the method for controlling the neighboring small cell by the macro-cell network-side device according to the reporting event is the same as that in the prior art, and its description is omitted herein for avoiding repetition.

In conclusion, with the mobility control method according to this embodiment of the present invention, a network-side device configures a measurement parameter including an E-CIO and/or an RE for a user equipment, and the user equipment determines a reporting event for a neighboring small cell according to the E-CIO with a greater range than a CIO, or the user equipment determines a reporting event for a neighboring small cell according to a CIO and the RE, or the user equipment determines a reporting event for a neighboring small cell according to the E-CIO and the RE. Therefore, it is easier for the user equipment to report a reporting event related to access to a small cell, to the network-side device, and coverage of the small cell can be extended effectively.

In this embodiment of the present invention, the small cell and the macro cell may be deployed at a same frequency or different frequencies. When the small cell and the macro cell are deployed at a same frequency, because network coverage of the macro cell may overlap coverage of the small cell, a co-channel interference problem may occur. That is, when the UE accessing a macro cell approaches but does not reach an area for a soft handover to the small cell, because a path loss from the UE to the macro-cell network-side device is obviously greater than a path loss from the UE to the small-cell network-side device, the UE causes uplink interference to the small cell, and therefore an uplink capacity of the small cell is reduced. In this embodiment of the present invention, transmit power of the small-cell network-side device is obviously lower than that of the macro-cell network-side device, and the UE triggers, by detecting downlink cell signal quality, behaviors such as joining the active set or performing a handover.

Therefore, optionally, in this embodiment of the present invention, the performing mobility control for the target cell according to the reporting event includes: performing interference control for the target cell according to an interference reporting event included in the reporting event.

Specifically, in this embodiment of the present invention, the interference reporting event may be added to indicate to the network-side device that the UE enters an area in which the UE causes interference to the small cell, and therefore, the network-side device may perform interference control for the small cell in time. In this embodiment of the present invention, control used to reduce interference for the neighboring small cell is the same as that in the prior art, and its description is omitted herein for avoiding repetition.

Optionally, in this embodiment of the present invention, the sending a first message to a user equipment includes: sending the first message to the user equipment, where the first message further includes a first identifier, where the first identifier is used to indicate that the measurement parameter is used to determine the interference reporting event; the receiving a third message, which is sent by the user equipment and includes third information, includes: receiving the third message, which is sent by the user equipment and includes the third information, where the third information is used to indicate the interference reporting event. The performing mobility control for the target cell according to the reporting event includes: performing interference control for the target cell according to the interference reporting event.

Specifically, in this embodiment of the present invention, an event and a threshold in the prior art may be used, and the event 1a (an example of the interference reporting event) is reported to indicate that the UE enters an uplink interference area, or the event 1b (another example of the interference reporting event) is reported to indicate that the UE leaves an uplink interference area. That is, when delivering a measurement parameter to the UE, the macro-cell network-side device may deliver an identifier (first identifier) used to indicate that the measurement parameter is used to determine an interference reporting event. Therefore, both the UE and the macro-cell network-side device may explicitly know that the event 1a reported by the UE is used to indicate that the UE enters an area in which the UE causes interference to the neighboring small cell, and that the event 1b is used to indicate that the UE leaves an area in which the UE causes interference to the neighboring small cell. Therefore, the macro-cell network-side device may perform, according to the event 1a or event 1b reported by the UE, control to reduce interference for the neighboring small cell. In this embodiment of the present invention, the control used to reduce interference for the neighboring small cell is the same as that in the prior art, and its description is omitted herein for avoiding repetition.

Alternatively, in this embodiment of the present invention, a new event and threshold may be used, and an event 1x (an example of the interference reporting event) is reported to indicate that the UE enters an uplink interference area, or an event 1y (another example of the interference reporting event) is reported to indicate that the UE leaves an uplink interference area. That is, when delivering a measurement parameter to the UE, the macro-cell network-side device may deliver an identifier (first identifier) used to indicate that the measurement parameter is used to determine an interference reporting event. Therefore, both the UE and the macro-cell network-side device may explicitly know that the event 1x reported by the UE is used to indicate that the UE enters an area in which the UE causes interference to the neighboring small cell, and that the event 1y is used to indicate that the UE leaves an area in which the UE causes interference to the neighboring small cell. Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

Optionally, in this embodiment of the present invention, the receiving a third message, which is sent by the user equipment and includes third information, includes receiving the third message, which is sent by the user equipment and includes the third information, where the third message further includes a second identifier, where the second identifier is used to indicate that the reporting event is the interference reporting event. The performing mobility control for the target cell according to the reporting event includes: determining, according to the second identifier, that the reporting event is the interference reporting event; and performing interference control for the target cell according to the interference reporting event.

Specifically, in this embodiment of the present invention, an event and a threshold in the prior art may be used, and the event 1a (an example of the interference reporting event) is reported to indicate that the UE enters an uplink interference area, or the event 1b (another example of the interference reporting event) is reported to indicate that the UE leaves an uplink interference area. That is, when the UE reports the event 1a or 1b to the macro-cell network-side device, the UE may report an identifier (second identifier) used to indicate that the reporting event is an interference reporting event, to the macro-cell network-side device. Therefore, both the UE and the macro-cell network-side device may explicitly know that the event 1a reported by the UE is used to indicate that the UE enters an area in which the UE causes interference to the neighboring small cell, and that the event 1b is used to indicate that the UE leaves an area in which the UE causes interference to the neighboring small cell. Therefore, the macro-cell network-side device may perform, according to the event 1a or event 1b reported by the UE, control to reduce interference for the neighboring small cell. In this embodiment of the present invention, the control used to reduce interference for the neighboring small cell is the same as that in the prior art, and its description is omitted herein for avoiding repetition.

Alternatively, a new event and threshold may be used, and an event 1x (an example of the interference reporting event) is reported to indicate that the UE enters an uplink interference area, or an event 1y (another example of the interference reporting event) is reported to indicate that the UE leaves an uplink interference area. That is, when the UE reports the event 1a or 1b to the macro-cell network-side device, the UE may report an identifier (second identifier) used to indicate that the reporting event is an interference reporting event, to the macro-cell network-side device. Therefore, both the UE and the macro-cell network-side device may explicitly know that the event 1x reported by the UE is used to indicate that the UE enters an area in which the UE causes interference to the neighboring small cell, and that the event 1y is used to indicate that the UE leaves an area in which the UE causes interference to the neighboring small cell. Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

In conclusion, with the mobility control method according to this embodiment of the present invention, by using the measurement parameter, the uplink interference can be detected before the UE enters the area in which the UE causes interference to the neighboring small cell, and subsequent interference control is started, which can avoid interference to the neighboring small cell.

Case 4

The small-cell network-side device may predetermine a second measurement parameter for a neighboring macro cell, so that after measuring (pilot) signal quality of a target neighboring macro cell and determining measured quality, the UE determines determined quality for the target neighboring macro cell according to the measured quality and the second measurement parameter, where the determined quality is a parameter used when the UE determines a reporting event for the neighboring macro cell or determines whether to reselect or hand over to the neighboring macro cell. It should be noted that in this embodiment of the present invention, "only for a neighboring macro cell" indicates that the second measurement parameter can be used only for determining determined quality of the neighboring macro cell, but cannot be used for determining determined quality of a neighboring small cell. The following omits descriptions of same or similar cases. In addition, the small-cell network-side device may configure the second measurement parameter according to the first measurement parameter (a measurement parameter configured by the macro-cell network-side device for the small cell); therefore, when the UE is in the macro cell, it is easier for the UE to select or report the small cell; when the UE is in the small cell corresponding to the macro cell, it is easier for the UE to camp on the small cell, or more difficult to report the corresponding macro cell, thereby avoiding a ping-pong problem. Specifically, the measurement parameter of the macro cell may be set to a negative value, or a reporting threshold of a corresponding event may be increased to achieve the foregoing objective.

The process of determining and delivering the second measurement parameter by the small-cell network-side device in S210b and S220b is the same as or similar to the process of determining and delivering the first measurement parameter by the macro-cell network-side device in S210a and S220a, and its description is omitted herein for avoiding repetition.

With the mobility control method according to this embodiment of the present invention, a network-side device configures a measurement parameter including an E-CIO and/or an RE for a user equipment, and the user equipment determines a reporting event for a neighboring macro cell according to the E-CIO with a greater range than a CIO, or the user equipment determines a reporting event for a neighboring macro cell according to a CIO and the RE, or the user equipment determines a reporting event for a neighboring macro cell according to the E-CIO and the RE. Therefore, coverage of a macro cell can be narrowed effectively, and occurrence of a ping-pong handover is avoided.

In this embodiment of the present invention, the small cell and the macro cell may be deployed at a same frequency or different frequencies. When the small cell and the macro cell are deployed at a same frequency, because network coverage of the macro cell may overlap coverage of the small cell, a co-channel interference problem may occur. That is, when the UE accessing a small cell approaches but does not reach an area for a soft handover to the macro cell, because a path loss from the UE to the small-cell network-side device is obviously greater than a path loss from the UE to the macro-cell network-side device, the UE causes uplink interference to the macro cell, and therefore an uplink capacity of the macro cell is reduced. In this embodiment of the present invention, transmit power of the small-cell network-side device is obviously lower than that of the macro-cell network-side device, and the UE triggers, by detecting downlink cell signal quality, behaviors such as joining the active set or performing a handover.

Therefore, optionally, in this embodiment of the present invention, the determining a reporting event for the target cell according to the measured quality of the target cell and the measurement parameter includes: determining an interference reporting event for the target cell according to the measured quality of the target cell and the measurement parameter, so that the network-side device performs interference control for the target cell according to the interference reporting event.

With the mobility control method according to this embodiment of the present invention, by using the measurement parameter, the uplink interference can be detected before the UE enters the area in which the UE causes interference to the neighboring macro cell, and subsequent interference control is started, which can avoid interference to the neighboring macro cell.

The mobility control methods according to the embodiments of the present invention are hereinbefore described in detail with reference to FIG. 1 and FIG. 2. Mobility control apparatuses according to embodiments of the present invention are hereinafter described in detail with reference to FIG. 3 and FIG. 4.

FIG. 3 shows a schematic block diagram of a mobility control apparatus 300 according to an embodiment of the present invention, which is described from a perspective of a user equipment. As shown in FIG. 3, the apparatus 300 includes the following.

A receiving unit 310, configured to receive a first message sent by a network-side device, and transmit first information, which is included in the first message and used to indicate a measurement parameter, to a processing unit 320, where the measurement parameter includes an extended-cell individual offset E-CIO and/or a range extension RE, where the E-CIO is used for measurement reporting, a range of the E-CIO is greater than a range of a cell individual offset CIO, and the RE can be used for a cell reselection and measurement reporting.

The processing unit 320, configured to acquire the first information from the receiving unit 310, and determine the measurement parameter according to the first information; and configured to perform mobility control for the target cell according to measured quality of a target cell and the measurement parameter.

In this embodiment of the present invention, the user equipment may be located in a macro cell, so that control is performed for a neighboring small cell according to a first measurement parameter delivered by the network-side device (a network-side device providing the macro cell, referred to as a macro-cell network-side device for ease of description hereinafter), or the user equipment may be located in a small cell, so that control is performed for a neighboring macro cell according to a second measurement parameter delivered by the network-side device. For ease of understanding, an example in which the network-side device is a network-side device providing a macro cell is used for description hereinafter.

The macro-cell network-side device may predetermine a first measurement parameter only for a neighboring small cell, so that after measuring (pilot) signal quality of a target neighboring small cell and determining measured quality, the UE determines determined quality for the target neighboring small cell according to the measured quality and the first measurement parameter, where the determined quality is a parameter used when the UE determines a reporting event for the neighboring small cell or determines whether to reselect or hand over to the neighboring small cell. It should be noted that in this embodiment of the present invention, "only for a neighboring small cell" indicates that the first measurement parameter can be used only for determining determined quality of the neighboring small cell, but cannot be used for determining determined quality of a neighboring macro cell. The following omits descriptions of same or similar cases.

Optionally, in this embodiment of the present invention, the apparatus further includes the following.

A sending unit 330 is configured to send a second message to the network-side device, where the second message includes second information used to indicate a measurement capability of the user equipment, so that the network-side device determines the measurement parameter according to the measurement capability of the user equipment.

Specifically, in this embodiment of the present invention, the UE may further report a detection capability of the UE to the macro-cell network-side device by using the sending unit 330. The detection capability may be, for example, a capability of detecting minimum transmit power by the UE; therefore, for example, if transmit power of the target small cell is lower than minimum transmit power that the UE can detect, that is, the UE cannot detect the target small cell, the macro-cell network-side device may not configure the first measurement parameter for the target small cell; if transmit power of the target small cell is higher than or equal to minimum transmit power that the UE can detect, the macro-cell network-side device may configure the first measurement parameter for the target small cell.

In this embodiment of the present invention, to make it easy for the UE to access the target neighboring small cell, the macro-cell network-side device may set a first measurement parameter used in different control cases for the target neighboring small cell.

Specifically, the first measurement parameter may include the E-CIO and/or the RE. For example, when transmit power of the neighboring small cell is low, the macro-cell network-side device may configure a large first measurement parameter for the neighboring small cell, so that determined quality determined for the neighboring small cell by the UE easily reaches a threshold of a reporting event (for example, an event 1a, 1b, or 1d), or so that it is easy for the UE to reselect or hand over to the neighboring small cell (for example, the determined quality easily becomes the highest quality in candidate cells). It should be understood that the foregoing exemplified case is only for exemplary description of the present invention, and the present invention is not limited thereto. That the processing unit 320 of the UE performs control for the neighboring small cell according to the first measurement parameter is later described in detail.

In addition, in this embodiment of the present invention, the macro-cell network-side device may configure a uniform first measurement parameter for all neighboring small cells, that is, the target small cell is all the neighboring small cells. Alternatively, the macro-cell network-side device may separately configure a first measurement parameter for a neighboring small cell. In this case, information indicating the first measurement parameter (first information) may carry an indication identifier (cell indication information) corresponding to the neighboring small cell, so that the UE may determine, according to the indication identifier, a small cell (target small cell) that can be controlled by using the first measurement parameter. Alternatively, the macro-cell network-side device may configure a same first measurement parameter for at least two neighboring small cells in all neighboring small cells. In this case, information indicating the first measurement parameter (first information) may carry an indication identifier (cell indication information) corresponding to the at least two neighboring small cells, so that the UE may determine, according to the indication identifier, a small cell (target small cell) that can be controlled by using the first measurement parameter.

Afterward, the macro-cell network-side device may send the information indicating the first measurement parameter (first information), to the UE by using, for example, system information (an example of the first message) and/or a measurement control message (another example of the first message).

The UE receives the first information by using the receiving unit 310; in addition, the UE extracts the first measurement parameter from the first information by using the processing unit 320.

Because the macro-cell network-side device configures, based on a cell scrambling code, a measurement parameter for a small cell, when several small cells use a same scrambling code, the UE cannot determine a specific small cell for which a corresponding measurement parameter is used.

Therefore, optionally, in this embodiment of the present invention, the first message received by the receiving unit 310 further includes cell indication information used to indicate the target cell. The processing unit 320 is further configured to determine the target cell according to the cell indication information; and configured to perform mobility control for the target cell according to the measured quality of the target cell and the measurement parameter.

Specifically, as described above, if the first measurement parameter configured by the macro-cell network-side device is corresponding to only one or more neighboring small cells (not applicable to all neighboring small cells), the information indicating the first measurement parameter (first information) carries an indication identifier (cell indication information) corresponding to the one or more neighboring small cells. Therefore, the UE may determine, according to the cell indication information, a neighboring small cell (target small cell) that can be controlled by using the first measurement parameter.

Optionally, in this embodiment of the present invention, the cell indication information includes location information used to indicate a location of the target cell, or transmit power information used to indicate transmit power of the target cell, or time difference information used to indicate a time difference between the target cell and a cell in which the user equipment is currently located.

Specifically, in a communications system of the present invention, it may be required that time differences between small cells and a same macro cell should set to be different; the macro-cell network-side device may indicate the target small cell according to a time difference. Therefore, the processing unit 320 of the UE may distinguish the target small cell according to time difference information indicating the time difference. Alternatively, measurement parameters of different small cells may be distinguished by using different location information or transmit power of the small cells. Herein, the location information of the small cell may be determined by determining detected signal quality of the macro cell, or determined by using GPS information. It should be understood that the foregoing exemplified parameters are only for exemplary description of the present invention, and the present invention is not limited thereto; other parameters that can uniquely indicate the target small cell all fall within the protection scope of the present invention.

Therefore, with the mobility control apparatus according to this embodiment of the present invention, a problem that a measurement parameter cannot be accurately applied due to reuse of a scrambling code can be avoided.

After the first measurement parameter for the target small cell is determined, the processing unit 320 of the UE may perform control for the target small cell according to the first measurement parameter.

Optionally, in this embodiment of the present invention, the processing unit 320 is specifically configured to determine a reporting event for the target cell according to the measured quality of the target cell and the measurement parameter, and transmit third information indicating the reporting event, to the sending unit 330.

The apparatus further includes: the sending unit 330, configured to acquire the third information from the processing unit 320, and send a third message to the network-side device, where the third message includes the third information.

Specifically, in this embodiment of the present invention, the processing unit 320 may evaluate, based on a sum of (or a difference between) the signal quality of the neighboring small cell and the first measurement parameter, whether the neighboring small cell meets a threshold of a measurement reporting event. Herein, the measurement reporting event may include: an event 1a (event1 a), indicating that pilot quality of a cell (herein referring to a neighboring small cell) reaches a reporting threshold (herein referring to reporting to the macro-cell network-side device), and mainly used for the macro-cell network-side device to add the cell to an active set; an event 1b (event1 b), indicating that pilot quality of a cell (herein referring to a neighboring small cell) reaches a reporting threshold (herein referring to reporting to the macro-cell network-side device), and mainly used for the macro-cell network-side device to delete the cell from the active set; and an event 1d (event1 d), indicating that a cell (herein referring to a neighboring small cell) becomes a cell having the best pilot quality among cells detected by the UE, and mainly used for triggering the macro-cell network-side device to control a handover of the UE to the neighboring small cell (namely, a soft handover). It should be understood that the foregoing exemplified reporting event for the neighboring small cell is only for exemplary description and the present invention is not limited thereto; other mobility-related measurement reporting events all fall within the protection scope of the present invention.

In this embodiment of the present invention, the first measurement parameter may include the E-CIO, or the first measurement parameter may include the RE, or the first measurement parameter may include the E-CIO and RE.

Optionally, the processing unit 320 is specifically configured to determine a first reporting event for the target cell according to the measured quality of the target cell and the E-CIO.

In addition, the processing unit 320 is specifically configured to determine, if a sum of the measured quality of the target cell and the extended-cell individual offset reaches a reporting threshold of an event 1a, that the reporting event is the event 1a.

Specifically, for example, after the processing unit 320 measures quality of the neighboring small cell, the processing unit 320 determines whether Mp+E-CIO meets the threshold of the event 1a (an example of the first reporting event); and if the Mp+E-CIO reaches the reporting threshold of the event 1a, reports the event 1a for the neighboring small cell to the network-side device. Because the E-CIO is greater than the CIO in this embodiment of the present invention, compared with the prior art, it is easier for the UE to report the event 1a for the neighboring small cell to the network-side device. Therefore, an effect of extending the coverage of the small cell can be achieved. Furthermore, because the E-CIO is only used to determine an event for the small cell, no impact on determining the related event of the neighboring macro cell is caused.

Optionally, the processing unit 320 is specifically configured to determine a second reporting event for the target cell according to the measured quality of the target cell and the RE; or configured to determine a third reporting event for the target cell according to the measured quality of the target cell, the RE, and the CIO.

In addition, the processing unit 320 is specifically configured to determine, if a sum of the measured quality of the target cell and the range extension reaches a reporting threshold of 1d, that the reporting event is the event 1d.

Specifically, for example, after the processing unit 320 measures quality of the neighboring small cell, the processing unit 320 determines whether Mp+RE meets the threshold of the event 1d (an example of the second reporting event), where the network-side device may make the RE greater than the CIO when configuring the RE; and if the Mp+RE reaches the reporting threshold of the event 1d, reports the event 1d for the neighboring small cell to the network-side device. Because the RE is greater than the CIO, compared with the prior art, it is easier for the UE to report the event 1d for the neighboring small cell to the network-side device. Therefore, an effect that it is easier for the UE to hand over to the neighboring small cell can be achieved. Furthermore, because the RE is only used to determine an event for the small cell, no impact on determining the related event of the neighboring macro cell is caused.

In addition, the processing unit 320 is specifically configured to determine, if a sum of the measured quality of the target cell, the extended-cell individual offset, and the range extension reaches the reporting threshold of the event 1a, that the reporting event is the event 1a.

For another example, after the processing unit 320 measures quality of the neighboring small cell, the processing unit 320 determines whether Mp+RE+CIO meets the threshold of the event 1a (an example of the third reporting event), where the network-side device may set the UE to a positive value when configuring the RE; and if the Mp+RE+CIO reaches the reporting threshold of the event 1a, reports the event 1a for the neighboring small cell to the network-side device. Because the Mp+RE+CIO is obviously greater than the Mp+CIO, compared with the prior art, it is easier for the UE to report the event 1a for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

Optionally, the processing unit 320 is specifically configured to determine a fourth reporting event for the target cell according to the measured quality of the target cell, the RE, and the E-CIO.

Specifically, for example, after the processing unit 320 measures quality of the neighboring small cell, the processing unit 320 determines whether Mp+RE+E-CIO meets the threshold of the event 1d (an example of the fourth reporting event), where the network-side device may set the UE to a positive value and/or set the E-CIO greater than the CIO when configuring the RE; and if the Mp+RE+E-CIO reaches the reporting threshold of the event 1d, reports the event 1d for the neighboring small cell to the network-side device. Because the Mp+RE+E-CIO is obviously greater than the Mp+CIO, compared with the prior art, it is easier for the UE to report the event 1d for the neighboring small cell to the network-side device. Therefore, an effect that it is easier for the UE to hand over to the neighboring small cell can be achieved. Furthermore, because the RE is only used to determine an event for the small cell, no impact on determining the related event of the neighboring macro cell is caused.

In conclusion, with the mobility control apparatus according to this embodiment of the present invention, a network-side device configures a measurement parameter including an E-CIO and/or an RE for a user equipment, and the user equipment determines a reporting event for a neighboring small cell according to the E-CIO with a greater range than a CIO, or the user equipment determines a reporting event for a neighboring small cell according to a CIO and the RE, or the user equipment determines a reporting event for a neighboring small cell according to the E-CIO and the RE. Therefore, coverage of a small cell can be extended effectively.

In this embodiment of the present invention, the small cell and the macro cell may be deployed at a same frequency or different frequencies. When the small cell and the macro cell are deployed at a same frequency, because network coverage of the macro cell may overlap coverage of the small cell, a co-channel interference problem may occur. That is, when the UE accessing a macro cell approaches but does not reach an area for a soft handover to the small cell, because a path loss from the UE to the macro-cell network-side device is obviously greater than a path loss from the UE to the small-cell network-side device, the UE causes uplink interference to the small cell, and therefore an uplink capacity of the small cell is reduced. In this embodiment of the present invention, transmit power of the small-cell network-side device is obviously lower than that of the macro-cell network-side device, and the UE triggers, by detecting downlink cell signal quality, behaviors such as joining the active set or performing a handover.

Therefore, optionally, in this embodiment of the present invention, the processing unit is specifically configured to determine an interference reporting event for the target cell according to the measured quality of the target cell and the measurement parameter, where the interference reporting event is used for the network-side device to perform interference control for the target cell.

Specifically, in this embodiment of the present invention, the interference reporting event may be added to indicate to the network-side device that the UE enters an area in which the UE causes interference to the small cell, and therefore, the network-side device may perform interference control for the small cell in time. In this embodiment of the present invention, control used to reduce interference for the neighboring small cell is the same as that in the prior art, and its description is omitted herein for avoiding repetition.

Optionally, the first message received by the receiving unit 310 further includes a first identifier, where the first identifier is used to indicate that the measurement parameter is used to determine the interference reporting event, where the interference reporting event is a reporting event used when the network-side device performs interference control for the target cell. The processing unit 320 is specifically configured to determine the interference reporting event according to the first identifier, the measured quality of the target cell, and the measurement parameter.

Specifically, in this embodiment of the present invention, an event and a threshold in the prior art may be used, and the event 1a (an example of the interference reporting event) is reported to indicate that the UE enters an uplink interference area, or the event 1b (another example of the interference reporting event) is reported to indicate that the UE leaves an uplink interference area. That is, when delivering a measurement parameter to the UE, the macro-cell network-side device may deliver an identifier (first identifier) used to indicate that the measurement parameter is used to determine an interference reporting event. Therefore, both the UE and the macro-cell network-side device may explicitly know that the event 1a reported by the UE is used to indicate that the UE enters an area in which the UE causes interference to the neighboring small cell, and that the event 1b is used to indicate that the UE leaves an area in which the UE causes interference to the neighboring small cell. Therefore, the macro-cell network-side device may perform, according to the event 1a or event 1b reported by the UE, control to reduce interference for the neighboring small cell. In this embodiment of the present invention, the control used to reduce interference for the neighboring small cell is the same as that in the prior art, and its description is omitted herein for avoiding repetition.

Alternatively, in this embodiment of the present invention, a new event and threshold may be used, and an event 1x (an example of the interference reporting event) is reported to indicate that the UE enters an uplink interference area, or an event 1y (another example of the interference reporting event) is reported to indicate that the UE leaves an uplink interference area. That is, when delivering a measurement parameter to the UE, the macro-cell network-side device may deliver an identifier (first identifier) used to indicate that the measurement parameter is used to determine an interference reporting event. Therefore, both the UE and the macro-cell network-side device may explicitly know that the event 1x reported by the UE is used to indicate that the UE enters an area in which the UE causes interference to the neighboring small cell, and that the event 1y is used to indicate that the UE leaves an area in which the UE causes interference to the neighboring small cell. Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

Optionally, in this embodiment of the present invention, the third message sent by the sending unit 330 further includes a second identifier, where the second identifier is used to indicate that the reporting event is the interference reporting event used when interference control is performed for the target cell, so that the network-side device performs interference control for the target cell according to the second identifier and the reporting event.

Specifically, in this embodiment of the present invention, an event and a threshold in the prior art may be used, and the event 1a (an example of the interference reporting event) is reported to indicate that the UE enters an uplink interference area, or the event 1b (another example of the interference reporting event) is reported to indicate that the UE leaves an uplink interference area. That is, when the UE reports the event 1a or 1b to the macro-cell network-side device, the UE may report an identifier (second identifier) used to indicate that the reporting event is an interference reporting event, to the macro-cell network-side device. Therefore, both the UE and the macro-cell network-side device may explicitly know that the event 1a reported by the UE is used to indicate that the UE enters an area in which the UE causes interference to the neighboring small cell, and that the event 1b is used to indicate that the UE leaves an area in which the UE causes interference to the neighboring small cell. Therefore, the macro-cell network-side device may perform, according to the event 1a or event 1b reported by the UE, control to reduce interference for the neighboring small cell. In this embodiment of the present invention, the control used to reduce interference for the neighboring small cell is the same as that in the prior art, and its description is omitted herein for avoiding repetition.

Alternatively, a new event and threshold may be used, and an event 1x (an example of the interference reporting event) is reported to indicate that the UE enters an uplink interference area, or an event 1y (another example of the interference reporting event) is reported to indicate that the UE leaves an uplink interference area. That is, when the UE reports the event 1a or 1b to the macro-cell network-side device, the UE may report an identifier (second identifier) used to indicate that the reporting event is an interference reporting event, to the macro-cell network-side device. Therefore, both the UE and the macro-cell network-side device may explicitly know that the event 1x reported by the UE is used to indicate that the UE enters an area in which the UE causes interference to the neighboring small cell, and that the event 1y is used to indicate that the UE leaves an area in which the UE causes interference to the neighboring small cell. Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

In conclusion, with the mobility control apparatus according to this embodiment of the present invention, by using the measurement parameter, the uplink interference can be detected before the UE enters the area in which the UE causes interference to the neighboring small cell, and subsequent interference control is started, which can avoid interference to the neighboring small cell.

Optionally, the processing unit 320 is specifically configured to determine, according to the measured quality of the target cell and the RE, that a reselection can be made to the target cell.

Specifically, the processing unit 320 may further perform a reselection operation for the target cell according to the measurement parameter. That is, after the UE measures quality of the neighboring small cell, the UE determines whether Mp+RE is the highest quality in cell quality that can be measured; and if yes, triggers a cell reselection process for the neighboring small cell. The cell reselection process of this embodiment of the present invention is the same as that in the prior art, and its description is omitted herein for avoiding repetition. In this embodiment of the present invention, because an offset (RE) used for the cell reselection is the same as an offset (RE) used for determining the reporting event, for ease of configuration, it is unnecessary to simultaneously modify parameters used for the cell reselection and measurement control in the prior art.

With the mobility control apparatus according to this embodiment of the present invention, the RE is uniformly used when a reporting event for the target cell is determined and when the cell reselection operation is performed for the target cell, which can facilitate configuration of the network-side device and parsing of the UE and facilitate parameter modification.

The mobility control apparatus 300 according to this embodiment of the present invention may be corresponding to a user equipment in a method according to an embodiment of the present invention. In addition, the units and modules in the mobility control apparatus 300, and the foregoing other operations and/or functions separately implement the corresponding processes in the method 100 in FIG. 1. For brevity, no repetition is provided herein.

FIG. 4 shows a schematic block diagram of a mobility control apparatus 400 according to an embodiment of the present invention, which is described from a perspective of a network-side device. As shown in FIG. 4, the apparatus 400 includes a processing unit 410, configured to determine a measurement parameter, and transmit first information used to indicate the measurement parameter, to a sending unit 420, where the measurement parameter includes an extended-cell individual offset E-CIO and/or a range extension RE, where the E-CIO is used for measurement reporting, a range of the E-CIO is greater than a range of a cell individual offset CIO, and the RE can be used for a cell reselection and measurement reporting.

The sending unit 420 is configured to send a first message to a user equipment, where the first message includes the first information, so that the user equipment performs mobility control for the target cell according to measured quality of a target cell and the measurement parameter.

In this embodiment of the present invention, the network-side device may be a network-side device providing a macro cell, and the user equipment may be located in the macro cell, so that control is performed for a neighboring small cell according to a first measurement parameter delivered by the macro-cell network-side device, or the network-side device may be a network-side device providing a small cell, and the user equipment may be located in the small cell, so that control is performed for a neighboring macro cell according to a second measurement parameter delivered by the small-cell network-side device. For ease of understanding, an example in which the network-side device is a network-side device providing a macro cell is used for description hereinafter.

The processing unit 410 of the macro-cell network-side device may predetermine a first measurement parameter only for a neighboring small cell, so that after measuring (pilot) signal quality of a target neighboring small cell and determining measured quality, the UE determines determined quality for the target neighboring small cell according to the measured quality and the first measurement parameter, where the determined quality is a parameter used when the UE determines a reporting event for the neighboring small cell or determines whether to reselect or hand over to the neighboring small cell. It should be noted that in this embodiment of the present invention, "only for a neighboring small cell" indicates that the first measurement parameter can be used only for determining determined quality of the neighboring small cell, but cannot be used for determining determined quality of a neighboring macro cell. The following omits descriptions of same or similar cases.

Optionally, in this embodiment of the present invention, the apparatus further includes the following.

A receiving unit 430 is configured to receive a second message sent by the user equipment, where the second message includes second information used to indicate a measurement capability of the user equipment, and transmit the second information to the processing unit 410. The processing unit 410 is further configured to determine the measurement parameter according to the measurement capability of the user equipment.

Specifically, in this embodiment of the present invention, the UE may further report a detection capability of the UE to the macro-cell network-side device. The detection capability may be, for example, a capability of detecting minimum transmit power by the UE; therefore, for example, if transmit power of the target small cell is lower than minimum transmit power that the UE can detect, that is, the UE cannot detect the target small cell, the macro-cell network-side device may not configure the first measurement parameter for the target small cell; if transmit power of the target small cell is higher than or equal to minimum transmit power that the UE can detect, the macro-cell network-side device may configure the first measurement parameter for the target small cell.

In this embodiment of the present invention, to make it easy for the UE to access the target neighboring small cell, the processing unit 410 of the macro-cell network-side device may set a first measurement parameter used in different control cases for the target neighboring small cell.

Specifically, the first measurement parameter may include the E-CIO and/or the RE. For example, when transmit power of the neighboring small cell is low, the processing unit 410 may configure a large first measurement parameter for the neighboring small cell, so that determined quality determined for the neighboring small cell by the UE easily reaches a threshold of a reporting event (for example, an event 1a, 1b, or 1d), or so that it is easy for the UE to reselect or hand over to the neighboring small cell (for example, the determined quality easily becomes the highest quality in candidate cells). It should be understood that the foregoing exemplified case is only for exemplary description of the present invention, and the present invention is not limited thereto.

In addition, in this embodiment of the present invention, the processing unit 410 may configure a uniform first measurement parameter for all neighboring small cells, that is, the target small cell is all the neighboring small cells. Alternatively, the processing unit 410 may separately configure a first measurement parameter for a neighboring small cell. In this case, information indicating the first measurement parameter (first information) may carry an indication identifier (cell indication information) corresponding to the neighboring small cell, so that the UE may determine, according to the indication identifier, a small cell (target small cell) that can be controlled by using the first measurement parameter. Alternatively, the processing unit 410 may configure a same first measurement parameter for at least two neighboring small cells in all neighboring small cells. In this case, information indicating the first measurement parameter (first information) may carry an indication identifier (cell indication information) corresponding to the at least two neighboring small cells, so that the UE may determine, according to the indication identifier, a small cell (target small cell) that can be controlled by using the first measurement parameter.

Afterward, the sending unit 420 may send the information indicating the first measurement parameter (first information), to the UE by using, for example, system information (an example of the first message) and/or a measurement control message (another example of the first message).

The UE receives the first information, and may extract the first measurement parameter from the first information.

Because the processing unit 410 configures, based on a cell scrambling code, a measurement parameter for a small cell, when several small cells use a same scrambling code, the UE cannot determine a specific small cell for which a corresponding measurement parameter is used.

Therefore, optionally, in this embodiment of the present invention, the processing unit 410 is specifically configured to determine, according to the target cell, a measurement parameter corresponding to the target cell; and the sending unit 420 is specifically configured to send the first message to the user equipment, where the first message further includes cell indication information used to indicate the target cell, so that the user equipment determines the target cell according to the cell indication information.

Specifically, as described above, if the first measurement parameter configured by the processing unit 410 is corresponding to only one or more neighboring small cells (not applicable to all neighboring small cells), the information indicating the first measurement parameter (first information) carries an indication identifier (cell indication information) corresponding to the one or more neighboring small cells. Therefore, the UE may determine, according to the cell indication information, a neighboring small cell (target small cell) that can be controlled by using the first measurement parameter.

Optionally, in this embodiment of the present invention, the cell indication information includes location information used to indicate a location of the target cell, or transmit power information used to indicate transmit power of the target cell, or time difference information used to indicate a time difference between the target cell and a cell in which the user equipment is currently located.

Specifically, in a communications system of the present invention, it may be required that time differences between small cells and a same macro cell should set to be different;

the processing unit 410 may indicate the target small cell according to a time difference. Therefore, the UE may distinguish the target small cell according to time difference information indicating the time difference. Alternatively, measurement parameters of different small cells may be distinguished by using different location information or transmit power of the small cells. Herein, the location information of the small cell may be determined by determining detected signal quality of the macro cell, or determined by using GPS information. It should be understood that the foregoing exemplified parameters are only for exemplary description of the present invention, and the present invention is not limited thereto; other parameters that can uniquely indicate the target small cell all fall within the protection scope of the present invention.

Therefore, with the mobility control apparatus according to this embodiment of the present invention, a problem that a measurement parameter cannot be accurately applied due to reuse of a scrambling code can be avoided.

After the first measurement parameter for the target small cell is determined, the UE may perform control for the target small cell according to the first measurement parameter.

Optionally, in this embodiment of the present invention, the apparatus further includes the following. The receiving unit 430, configured to receive a third message, which is sent by the user equipment and includes third information, where the third information is used to indicate a reporting event for the target cell, where the reporting event is determined by the user equipment according to the measured quality of the target cell and the measurement parameter, and transmit the third information to the processing unit 410. The processing unit 410 is specifically configured to perform mobility control for the target cell according to the reporting event.

Specifically, in this embodiment of the present invention, the UE may evaluate, based on a sum of (or a difference between) the signal quality of the neighboring small cell and the first measurement parameter, whether the neighboring small cell meets a threshold of a measurement reporting event. Herein, the measurement reporting event may include: an event 1a (event1 a), indicating that pilot quality of a cell (herein referring to a neighboring small cell) reaches a reporting threshold (herein referring to reporting to the macro-cell network-side device), and mainly used for the macro-cell network-side device to add the cell to an active set; an event 1b (event1 b), indicating that pilot quality of a cell (herein referring to a neighboring small cell) reaches a reporting threshold (herein referring to reporting to the macro-cell network-side device), and mainly used for the macro-cell network-side device to delete the cell from the active set; and an event 1d (event1 d), indicating that a cell (herein referring to a neighboring small cell) becomes a cell having the best pilot quality among cells detected by the UE, and mainly used for triggering the macro-cell network-side device to control a handover of the UE to the neighboring small cell (namely, a soft handover). It should be understood that the foregoing exemplified reporting event for the neighboring small cell is only for exemplary description and the present invention is not limited thereto; other mobility-related measurement reporting events all fall within the protection scope of the present invention.

Optionally, the measurement parameter includes the extended-cell individual offset E-CIO and/or the range extension RE, where the range of the E-CIO is greater than the range of the cell individual offset CIO. That is, in this embodiment of the present invention, the first measurement parameter may include the E-CIO, or the first measurement parameter may include the RE, or the first measurement parameter may include the E-CIO and RE.

In one aspect, for example, after the UE measures quality of the neighboring small cell, the UE determines whether Mp+E-CIO meets the threshold of the event 1a (an example of the first reporting event); and if the Mp+E-CIO reaches the reporting threshold of the event 1a, reports the event 1a for the neighboring small cell to the network-side device. Because the E-CIO is greater than the CIO in this embodiment of the present invention, compared with the prior art, it is easier for the UE to report the event 1a for the neighboring small cell to the network-side device. Therefore, an effect of extending the coverage of the small cell can be achieved. Furthermore, because the E-CIO is only used to determine an event for the small cell, no impact on determining the related event of the neighboring macro cell is caused.

In another aspect, for example, after the UE measures quality of the neighboring small cell, the UE determines whether Mp+RE meets the threshold of the event 1d (an example of the second reporting event), where the network-side device may make the RE greater than the CIO when configuring the RE; and if the Mp+RE reaches the reporting threshold of the event 1d, reports the event 1d for the neighboring small cell to the network-side device. Because the RE is greater than the CIO, compared with the prior art, it is easier for the UE to report the event 1d for the neighboring small cell to the network-side device. Therefore, an effect that it is easier for the UE to hand over to the neighboring small cell can be achieved. Furthermore, because the RE is only used to determine an event for the small cell, no impact on determining the related event of the neighboring macro cell is caused.

For another example, after the UE measures quality of the neighboring small cell, the UE determines whether Mp+RE+CIO meets the threshold of the event 1a (an example of the third reporting event), where the network-side device may set the UE to a positive value when configuring the RE; and if the Mp+RE+CIO reaches the reporting threshold of the event 1a, reports the event 1a for the neighboring small cell to the network-side device. Because the Mp+RE+CIO is obviously greater than the Mp+CIO, compared with the prior art, it is easier for the UE to report the event 1a for the neighboring small cell to the network-side device. Therefore, an effect of extending the coverage of the small cell can be achieved. Furthermore, because the RE is only used to determine an event for the small cell, no impact on determining the related event of the neighboring macro cell is caused.

In still another aspect, for example, after the UE measures quality of the neighboring small cell, the UE determines whether Mp+RE+E-CIO meets the threshold of the event 1d (an example of the fourth reporting event), where the network-side device may set the UE to a positive value and/or set the E-CIO greater than the CIO when configuring the RE and E-CIO; and if the Mp+RE+E-CIO reaches the reporting threshold of the event 1d, reports the event 1d for the neighboring small cell to the network-side device. Because the Mp+RE+E-CIO is obviously greater than the Mp+CIO, compared with the prior art, it is easier for the UE to report the event 1d for the neighboring small cell to the network-side device. Therefore, an effect that it is easier for the UE to hand over to the neighboring small cell can be achieved. Furthermore, because the RE is only used to determine an event for the small cell, no impact on determining the related event of the neighboring macro cell is caused.

In this embodiment of the present invention, the method for controlling the neighboring small cell by the processing unit 410 according to the reporting event is the same as that in the prior art, and its description is omitted herein for avoiding repetition.

In conclusion, with the mobility control apparatus according to this embodiment of the present invention, a network-side device configures a measurement parameter including an E-CIO and/or an RE for a user equipment, and the user equipment determines a reporting event for a neighboring small cell according to the E-CIO with a greater range than a CIO, or the user equipment determines a reporting event for a neighboring small cell according to a CIO and the RE, or the user equipment determines a reporting event for a neighboring small cell according to the E-CIO and the RE. Therefore, coverage of a small cell can be extended effectively.

In this embodiment of the present invention, the small cell and the macro cell may be deployed at a same frequency or different frequencies. When the small cell and the macro cell are deployed at a same frequency, because network coverage of the macro cell may overlap coverage of the small cell, a co-channel interference problem may occur. That is, when the UE accessing a macro cell approaches but does not reach an area for a soft handover to the small cell, because a path loss from the UE to the macro-cell network-side device is obviously greater than a path loss from the UE to the small-cell network-side device, the UE causes uplink interference to the small cell, and therefore an uplink capacity of the small cell is reduced. In this embodiment of the present invention, transmit power of the small-cell network-side device is obviously lower than that of the macro-cell network-side device, and the UE triggers, by detecting downlink cell signal quality, behaviors such as joining the active set or performing a handover.

Therefore, optionally, in this embodiment of the present invention, the processing unit 410 is specifically configured to perform interference control for the target cell according to an interference reporting event included in the reporting event.

Specifically, in this embodiment of the present invention, the interference reporting event may be added to indicate to the network-side device that the UE enters an area in which the UE causes interference to the small cell, and therefore, the network-side device may perform interference control for the small cell in time. In this embodiment of the present invention, control used to reduce interference for the neighboring small cell is the same as that in the prior art, and its description is omitted herein for avoiding repetition.

Optionally, the sending unit 420 is specifically configured to send the first message to the user equipment, where the first message further includes a first identifier, where the first identifier is used to indicate that the measurement parameter is used to determine the interference reporting event;

the receiving unit 430 is further configured to receive the third message, which is sent by the user equipment and includes the third information, where the third information is used to indicate the interference reporting event; and the processing unit 410 is further configured to perform interference control for the target cell according to the interference reporting event.

Specifically, in this embodiment of the present invention, an event and a threshold in the prior art may be used, and the event 1a (an example of the interference reporting event) is reported to indicate that the UE enters an uplink interference area, or the event 1b (another example of the interference reporting event) is reported to indicate that the UE leaves an uplink interference area. That is, when delivering a measurement parameter to the UE, the macro-cell network-side device may deliver an identifier (first identifier) used to indicate that the measurement parameter is used to determine an interference reporting event. Therefore, both the UE and the macro-cell network-side device may explicitly know that the event 1a reported by the UE is used to indicate that the UE enters an area in which the UE causes interference to the neighboring small cell, and that the event 1b is used to indicate that the UE leaves an area in which the UE causes interference to the neighboring small cell. Therefore, the macro-cell network-side device may perform, according to the event 1a or event 1b reported by the UE, control to reduce interference for the neighboring small cell. In this embodiment of the present invention, the control used to reduce interference for the neighboring small cell is the same as that in the prior art, and its description is omitted herein for avoiding repetition.

Alternatively, in this embodiment of the present invention, a new event and threshold may be used, and an event 1x (an example of the interference reporting event) is reported to indicate that the UE enters an uplink interference area, or an event 1y (another example of the interference reporting event) is reported to indicate that the UE leaves an uplink interference area. That is, when delivering a measurement parameter to the UE, the macro-cell network-side device may deliver an identifier (first identifier) used to indicate that the measurement parameter is used to determine an interference reporting event. Therefore, both the UE and the macro-cell network-side device may explicitly know that the event 1x reported by the UE is used to indicate that the UE enters an area in which the UE causes interference to the neighboring small cell, and that the event 1y is used to indicate that the UE leaves an area in which the UE causes interference to the neighboring small cell. Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

Optionally, in this embodiment of the present invention, the receiving unit 430 is further configured to receive the third message, which is sent by the user equipment and includes the third information, where the third message further includes a second identifier, where the second identifier is used to indicate that the reporting event is the interference reporting event; and the processing unit 410 is further configured to determine, according to the second identifier, that the reporting event is the interference reporting event; and configured to perform interference control for the target cell according to the interference reporting event.

Specifically, in this embodiment of the present invention, an event and a threshold in the prior art may be used, and the event 1a (an example of the interference reporting event) is reported to indicate that the UE enters an uplink interference area, or the event 1b (another example of the interference reporting event) is reported to indicate that the UE leaves an uplink interference area. That is, when the UE reports the event 1a or 1b to the macro-cell network-side device, the UE may report an identifier (second identifier) used to indicate that the reporting event is an interference reporting event, to the macro-cell network-side device. Therefore, both the UE and the macro-cell network-side device may explicitly know that the event 1a reported by the UE is used to indicate that the UE enters an area in which the UE causes interference to the neighboring small cell, and that the event 1b is used to indicate that the UE leaves an area in which the UE causes interference to the neighboring small cell. Therefore, the macro-cell network-side device may perform, according to the event 1a or event 1b reported by the UE, control to reduce interference for the neighboring small cell. In this embodiment of the present invention, the control used to reduce interference for the neighboring small cell is the same as that in the prior art, and its description is omitted herein for avoiding repetition.

Alternatively, a new event and threshold may be used, and an event 1x (an example of the interference reporting event) is reported to indicate that the UE enters an uplink interference area, or an event 1y (another example of the interference reporting event) is reported to indicate that the UE leaves an uplink interference area. That is, when the UE reports the event 1a or 1b to the macro-cell network-side device, the UE may report an identifier (second identifier) used to indicate that the reporting event is an interference reporting event, to the macro-cell network-side device. Therefore, both the UE and the macro-cell network-side device may explicitly know that the event 1x reported by the UE is used to indicate that the UE enters an area in which the UE causes interference to the neighboring small cell, and that the event 1y is used to indicate that the UE leaves an area in which the UE causes interference to the neighboring small cell. Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

In conclusion, with the mobility control apparatus according to this embodiment of the present invention, by using the measurement parameter, the uplink interference can be detected before the UE enters the area in which the UE causes interference to the neighboring small cell, and subsequent interference control is started, which can avoid interference to the neighboring small cell.

With the mobility control apparatus according to this embodiment of the present invention, a network-side device configures, for a user equipment, a measurement parameter used when control is performed for a neighboring small cell, or a measurement parameter used when control is performed for a neighboring macro cell. Therefore, personalized control can be performed for the small cell and macro cell, and interference between the small cell and the macro cell can be avoided, that is, coverage of the macro cell is not extended when coverage of the small cell is extended, or coverage of the small cell is not narrowed when coverage of the macro cell is narrowed.

The mobility control apparatus 400 according to this embodiment of the present invention may be corresponding to a network-side device (including a macro-cell network-side device or a micro-cell network-side device) in a method according to an embodiment of the present invention. In addition, the units and modules in the mobility control apparatus 400, and the foregoing other operations and/or functions separately implement the corresponding processes in the method 200 in FIG. 2. For brevity, no repetition is provided herein.

FIG. 5 shows a schematic flowchart of a mobility control method 500 according to an embodiment of the present invention, which is described from a perspective of a user equipment. As shown in FIG. 5, the method 500 includes:

S510. A user equipment determines, according to measured quality of a target cell, an interference reporting event for the target cell, where the interference reporting event includes a first interference event used to indicate that the user equipment enters an area in which the user equipment causes interference to the target cell or a second interference reporting event used to indicate that the user equipment leaves an area in which the user equipment causes interference to the target cell.

S520. Send a fourth message to the network-side device, where the fourth message includes fourth information used to indicate the interference reporting event.

Specifically, in this embodiment of the present invention, a small cell and a macro cell may be deployed at a same frequency or different frequencies. When the small cell and the macro cell are deployed at a same frequency, because network coverage of the macro cell may overlap coverage of the small cell, a co-channel interference problem may occur. For example, when the UE accessing a macro cell approaches but does not reach an area for a soft handover to the small cell, because a path loss from the UE to a macro-cell network-side device is obviously greater than a path loss from the UE to a small-cell network-side device, the UE causes uplink interference to the small cell, and therefore an uplink capacity of the small cell is reduced. In this embodiment of the present invention, transmit power of the small-cell network-side device is obviously lower than that of the macro-cell network-side device, and the UE triggers, by detecting downlink cell signal quality, behaviors such as joining an active set or performing a handover. Therefore, the interference reporting event may be added to indicate to the network-side device that the UE enters an area in which the UE causes interference to the small cell.

In this embodiment of the present invention, a new event and threshold may be used, and an event 1x (an example of the interference reporting event, namely, a first interference reporting event) is reported to indicate that the UE enters an uplink interference area, or an event 1y (another example of the interference reporting event, namely, a first interference reporting event) is reported to indicate that the UE leaves an uplink interference area. For example, in S510a, after the UE measures quality (Mp) of the neighboring small cell, the UE determines whether the Mp meets the threshold of the event 1x; and if the Mp reaches the reporting threshold of the event 1x, in S520a, the UE reports the event 1x for the neighboring small cell to the network-side device.

Likewise, in S510b, after the UE measures quality (Mp) of the neighboring small cell, the UE determines whether the Mp meets the threshold of the event 1y; and if the Mp reaches the reporting threshold of the event 1y, in S520b, reports the event 1y for the neighboring small cell to the network-side device.

Therefore, the macro-cell network-side device may perform, according to the event 1x or event 1y reported by the UE, control to reduce interference for the neighboring cell. In this embodiment of the present invention, the control used to reduce interference for the neighboring cell is the same as that in the prior art, and its description is omitted herein for avoiding repetition.

Optionally, in this embodiment of the present invention, before the determining, by a user equipment according to measured quality of a target cell, an interference reporting event for the target cell, the method further includes: receiving a fifth message sent by the network-side device, where the fifth message includes cell indication information used to indicate the target cell; and determining, by the user equipment, the target cell according to the cell indication information.

The fifth message sent by the network-side device may be a measurement control message (Measurement Control message).

Specifically, for example, if a network side requires the UE to detect and report interference for a part of cells, the network-side device may further deliver an indication to the UE to determine a cell (a target cell) for which interference measurement reporting needs to be performed (an example of cell indication information), where the indication may be an indication added to a neighboring cell list, or a list added to a neighboring cell list, to indicate the cell for which interference measurement reporting needs to be performed. Therefore, the UE may only determine whether measured quality of the neighboring cell identified by the indication reaches a reporting threshold of an interference event.

Optionally, in this embodiment of the present invention, the cell indication information includes location information used to indicate a location of the target cell, or transmit power information used to indicate transmit power of the target cell, or time difference information used to indicate a time difference between the target cell and a cell in which the user equipment is currently located.

Specifically, in a communications system of the present invention, it may be required that time differences between small cells and a same macro cell should set to be different; the macro-cell network-side device may indicate the target small cell according to a time difference. Therefore, the UE may distinguish the target small cell according to time difference information indicating the time difference. Alternatively, measurement parameters of different small cells may be distinguished by using different location information or transmit power of the small cells. Herein, the location information of the small cell may be determined by determining detected signal quality of the macro cell, or determined by using GPS information. It should be understood that the foregoing exemplified parameters are only for exemplary description of the present invention, and the present invention is not limited thereto; other parameters that can uniquely indicate the target small cell all fall within the protection scope of the present invention.

Therefore, with the mobility control method according to this embodiment of the present invention, a problem that a measurement parameter cannot be accurately applied due to reuse of a scrambling code can be avoided.

Optionally, in this embodiment of the present invention, that the determining, by a user equipment according to measured quality of a target cell, an interference reporting event for the target cell, includes: determining, by the user equipment according to measured quality of a first target cell, a first interference reporting event for the first target cell; and recording the first target cell, and determining a second interference reporting event for the first target cell only according to the measured quality of the first target cell.

Specifically, after the UE determines that the measured quality of the first target cell reaches the reporting threshold of the first interference reporting event 1x, the UE reports the first interference reporting event for the first target cell to the network-side device. Therefore, the UE may determine that the network-side device may start interference control for the first target cell, and the UE may record the first target cell, and may only determine whether the measured quality of the first target cell reaches the reporting threshold of the second interference reporting event. Therefore, unnecessary energy consumption and time consumption can be avoided, and performance of the system can be improved.

With the mobility control method according to this embodiment of the present invention, by introducing the interference reporting event, the uplink interference can be detected before the UE enters the area in which the UE causes interference to the neighboring cell, and subsequent interference control is started, which can avoid interference to the neighboring cell.

The process of determining the interference reporting event for the neighboring cell (including the macro cell and small cell) by the UE accessing a macro cell is exemplified above. It should be understood that the present invention is not limited thereto. A process of determining the interference reporting event for the neighboring cell by the UE accessing a small cell is similar to the foregoing process, and its description is omitted herein for avoiding repetition.

FIG. 6 shows a schematic flowchart of a mobility control method 600 according to an embodiment of the present invention, which is described from a perspective of a network-side device. As shown in FIG. 6, the method 600 includes:

S610. Receive a fourth message, which is sent by a user equipment and includes fourth information, where the fourth information is used to indicate an interference reporting event for a target cell, where the interference reporting event includes a first interference event used to indicate that the user equipment enters an area in which the user equipment causes interference to the target cell or a second interference reporting event used to indicate that the user equipment leaves an area in which the user equipment causes interference to the target cell.

S620. Perform interference control for the target cell according to the interference reporting event.

Specifically, in this embodiment of the present invention, a small cell and a macro cell may be deployed at a same frequency or different frequencies. When the small cell and the macro cell are deployed at a same frequency, because network coverage of the macro cell may overlap coverage of the small cell, a co-channel interference problem may occur. For example, when the UE accessing a macro cell approaches but does not reach an area for a soft handover to the small cell, because a path loss from the UE to a macro-cell network-side device is obviously greater than a path loss from the UE to a small-cell network-side device, the UE causes uplink interference to the small cell, and therefore an uplink capacity of the small cell is reduced. In this embodiment of the present invention, transmit power of the small-cell network-side device is obviously lower than that of the macro-cell network-side device, and the UE triggers, by detecting downlink cell signal quality, behaviors such as joining an active set or performing a handover. Therefore, the interference reporting event may be added to indicate to the network-side device that the UE enters an area in which the UE causes interference to the small cell.

In this embodiment of the present invention, a new event and threshold may be used, and an event 1x (an example of the interference reporting event, namely, a first interference reporting event) is reported to indicate that the UE enters an uplink interference area, or an event 1y (another example of the interference reporting event, namely, a first interference reporting event) is reported to indicate that the UE leaves an uplink interference area. For example, after the UE measures quality (Mp) of the neighboring small cell, the UE determines whether the Mp meets the threshold of the event 1x;

and if the Mp reaches the reporting threshold of the event 1x, the UE reports the event 1x for the neighboring small cell to the network-side device.

Likewise, after the UE measures quality (Mp) of the neighboring small cell, the UE determines whether the Mp meets the threshold of the event 1y; and if the Mp reaches the reporting threshold of the event 1y, reports the event 1y for the neighboring small cell to the network-side device.

Therefore, in S610, the macro-cell network-side device may acquire the interference reporting event (event 1x or event 1y) for the neighboring small cell, and therefore in S610, may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

Optionally, in this embodiment of the present invention, before the receiving a fourth message, which is sent by a user equipment and includes fourth information, the method further includes:

sending a fifth message to the user equipment, where the fifth message includes cell indication information used to indicate the target cell, so that the user equipment determines the target cell according to the cell indication information.

The fifth message sent by the network-side device may be a measurement control message (Measurement Control message).

Specifically, for example, if a network side requires the UE to detect and report interference for a part of cells, the network-side device may further deliver an indication to the UE to determine a cell (a target cell) for which interference measurement reporting needs to be performed (an example of cell indication information), where the indication may be an indication added to a neighboring cell list, or a list added to a neighboring cell list, to indicate the cell for which interference measurement reporting needs to be performed. Therefore, the UE may only determine whether measured quality of the neighboring cell identified by the indication reaches a reporting threshold of an interference event.

Optionally, in this embodiment of the present invention, the cell indication information includes location information used to indicate a location of the target cell, or transmit power information used to indicate transmit power of the target cell, or time difference information used to indicate a time difference between the target cell and a cell in which the user equipment is currently located.

Specifically, in a communications system of the present invention, it may be required that time differences between small cells and a same macro cell should set to be different; the macro-cell network-side device may indicate the target small cell according to a time difference. Therefore, the UE may distinguish the target small cell according to time difference information indicating the time difference. Alternatively, measurement parameters of different small cells may be distinguished by using different location information or transmit power of the small cells. Herein, the location information of the small cell may be determined by determining detected signal quality of the macro cell, or determined by using GPS information. It should be understood that the foregoing exemplified parameters are only for exemplary description of the present invention, and the present invention is not limited thereto; other parameters that can uniquely indicate the target small cell all fall within the protection scope of the present invention.

Therefore, with the mobility control method according to this embodiment of the present invention, a problem that a measurement parameter cannot be accurately applied due to reuse of a scrambling code can be avoided.

With the mobility control method according to this embodiment of the present invention, by introducing the interference reporting event, the uplink interference can be detected before the UE enters the area in which the UE causes interference to the neighboring cell, and subsequent interference control is started, which can avoid interference to the neighboring cell.

The process of performing control by the network-side device of a macro network according to the interference reporting event for the neighboring cell (including the macro cell and small cell) is exemplified above. It should be understood that the present invention is not limited thereto. A process of performing control by the network-side device of a small network according to the interference reporting event for the neighboring cell is similar to the foregoing process, and its description is omitted herein for avoiding repetition.

The mobility control methods according to the embodiments of the present invention are hereinbefore described in detail with reference to FIG. 5 and FIG. 6. Mobility control apparatuses according to embodiments of the present invention are hereinafter described in detail with reference to FIG. 7 and FIG. 8.

FIG. 7 shows a schematic block diagram of a mobility control apparatus 700 according to an embodiment of the present invention, which is described from a perspective of a user equipment. As shown in FIG. 7, the apparatus 700 includes:

a processing unit 710, configured to cause a user equipment to determine, according to measured quality of a target cell, an interference reporting event for the target cell, and transmit information indicating the interference reporting event, to a sending unit 720, where the interference reporting event includes a first interference event used to indicate that the user equipment enters an area in which the user equipment causes interference to the target cell or a second interference reporting event used to indicate that the user equipment leaves an area in which the user equipment causes interference to the target cell. The sending unit 720, configured to acquire the information indicating the interference reporting event, from the processing unit 710, and send a fourth message to the network-side device, where the fourth message includes fourth information used to indicate the interference reporting event.

Specifically, in this embodiment of the present invention, a small cell and a macro cell may be deployed at a same frequency or different frequencies. When the small cell and the macro cell are deployed at a same frequency, because network coverage of the macro cell may overlap coverage of the small cell, a co-channel interference problem may occur. For example, when the UE accessing a macro cell approaches but does not reach an area for a soft handover to the small cell, because a path loss from the UE to a macro-cell network-side device is obviously greater than a path loss from the UE to a small-cell network-side device, the UE causes uplink interference to the small cell, and therefore an uplink capacity of the small cell is reduced. In this embodiment of the present invention, transmit power of the small-cell network-side device is obviously lower than that of the macro-cell network-side device, and the UE triggers, by detecting downlink cell signal quality, behaviors such as joining an active set or performing a handover. Therefore, the interference reporting event may be added to indicate to the network-side device that the UE enters an area in which the UE causes interference to the small cell.

In this embodiment of the present invention, a new event and threshold may be used, and an event 1x (an example of the interference reporting event, namely, a first interference reporting event) is reported to indicate that the UE enters an uplink interference area, or an event 1y (another example of the interference reporting event, namely, a first interference reporting event) is reported to indicate that the UE leaves an uplink interference area. For example, after the UE measures quality (Mp) of the neighboring small cell, the processing unit 710 determines whether the Mp meets the threshold of the event 1x; and if the Mp reaches the reporting threshold of the event 1x, instructs the sending unit 720 to report the event 1x for the neighboring small cell to the network-side device.

Likewise, after the UE measures quality (Mp) of the neighboring small cell, the processing unit 710 determines whether the Mp meets the threshold of the event 1y; and if the Mp reaches the reporting threshold of the event 1y, instructs the sending unit 720 to report the event 1y for the neighboring small cell to the network-side device.

Therefore, the macro-cell network-side device may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

Optionally, in this embodiment of the present invention, the apparatus 700 further includes the following. A receiving unit 730, configured to receive a fifth message sent by the network-side device, where the fifth message includes cell indication information used to indicate the target cell for which interference measurement reporting is performed, and transmit the cell indication information to the processing unit 710. The processing unit 710 is further configured to acquire the cell indication information from the receiving unit 730, and determine, according to the cell indication information, the target cell for which interference measurement reporting needs to be performed.

The fifth message sent by the network-side device may be a measurement control message.

Specifically, for example, if a network side requires the UE to detect and report interference for a part of cells, the network-side device may further deliver an indication to the UE to determine a cell (a target cell) for which interference measurement reporting needs to be performed (an example of cell indication information), where the indication may be an indication added to a neighboring cell list, or a list added to a neighboring cell list, to indicate the cell for which interference measurement reporting needs to be performed. Therefore, after the receiving unit 730 receives the list, the processing unit 710 may only determine whether measured quality of the neighboring cell identified by the indication reaches a reporting threshold of an interference event.

Optionally, in this embodiment of the present invention, the cell indication information includes location information used to indicate a location of the target cell, or transmit power information used to indicate transmit power of the target cell, or time difference information used to indicate a time difference between the target cell and a cell in which the user equipment is currently located.

Specifically, in a communications system of the present invention, it may be required that time differences between small cells and a same macro cell should set to be different; the macro-cell network-side device may indicate the target small cell according to a time difference. Therefore, the UE may distinguish the target small cell according to time difference information indicating the time difference. Alternatively, measurement parameters of different small cells may be distinguished by using different location information or transmit power of the small cells. Herein, the location information of the small cell may be determined by determining detected signal quality of the macro cell, or determined by using GPS information. It should be understood that the foregoing exemplified parameters are only for exemplary description of the present invention, and the present invention is not limited thereto; other parameters that can uniquely indicate the target small cell all fall within the protection scope of the present invention.

Therefore, with the mobility control apparatus according to this embodiment of the present invention, a problem that a measurement parameter cannot be accurately applied due to reuse of a scrambling code can be avoided.

Optionally, in this embodiment of the present invention, the processing unit 710 is specifically configured to determine, according to measured quality of a first target cell, a first interference reporting event for the first target cell; and configured to record the first target cell, and determine a second interference reporting event for the first target cell only according to the measured quality of the first target cell.

Specifically, after the processing unit 710 determines that the measured quality of the first target cell reaches the reporting threshold of the first interference reporting event 1x, the first interference reporting event for the first target cell is reported to the network-side device. Therefore, the processing unit 710 may determine that the network-side device may start interference control for the first target cell, and the processing unit 710 may record the first target cell, and may only determine whether the measured quality of the first target cell reaches the reporting threshold of the second interference reporting event. Therefore, unnecessary energy consumption and time consumption can be avoided, and performance of the system can be improved.

With the mobility control apparatus according to this embodiment of the present invention, by introducing the interference reporting event, the uplink interference can be detected before the UE enters the area in which the UE causes interference to the neighboring small cell, and subsequent interference control is started, which can avoid interference to the neighboring small cell.

The mobility control apparatus 700 according to this embodiment of the present invention may be corresponding to a user equipment in a method according to an embodiment of the present invention. In addition, the units and modules in the mobility control apparatus 700, and the foregoing other operations and/or functions separately implement the corresponding processes in the method 500 in FIG. 5. For brevity, no repetition is provided herein.

The process of measuring the interference reporting event for the neighboring cell by the UE accessing a macro cell is exemplified above. It should be understood that the present invention is not limited thereto. A process of measuring the interference reporting event for the neighboring cell by the UE accessing a small cell is similar to the foregoing process, and its description is omitted herein for avoiding repetition.

FIG. 8 shows a schematic block diagram of a mobility control apparatus 800 according to an embodiment of the present invention, which is described from a perspective of a network device. As shown in FIG. 8, the apparatus 800 includes the following.

A receiving unit 810, configured to receive a fourth message, which is sent by a user equipment and includes fourth information, where the fourth information is used to indicate an interference reporting event for a target cell, and transmit the information indicating the interference reporting event, to a processing unit 820, where the interference reporting event includes a first interference event used to indicate that the user equipment enters an area in which the user equipment causes interference to the target cell or a second interference reporting event used to indicate that the user equipment leaves an area in which the user equipment causes interference to the target cell. The processing unit 820, configured to acquire the information indicating the interference reporting event from the receiving unit 810, and perform interference control for the target cell according to the interference reporting event.

Specifically, in this embodiment of the present invention, a small cell and a macro cell may be deployed at a same frequency or different frequencies. When the small cell and the macro cell are deployed at a same frequency, because network coverage of the macro cell may overlap coverage of the small cell, a co-channel interference problem may occur. For example, when the UE accessing a macro cell approaches but does not reach an area for a soft handover to the small cell, because a path loss from the UE to a macro-cell network-side device is obviously greater than a path loss from the UE to a small-cell network-side device, the UE causes uplink interference to the small cell, and therefore an uplink capacity of the small cell is reduced. In this embodiment of the present invention, transmit power of the small-cell network-side device is obviously lower than that of the macro-cell network-side device, and the UE triggers, by detecting downlink cell signal quality, behaviors such as joining an active set or performing a handover. Therefore, the interference reporting event may be added to indicate to the network-side device that the UE enters an area in which the UE causes interference to the small cell.

In this embodiment of the present invention, a new event and threshold may be used, and an event 1x (an example of the interference reporting event, namely, a first interference reporting event) is reported to indicate that the UE enters an uplink interference area, or an event 1y (another example of the interference reporting event, namely, a first interference reporting event) is reported to indicate that the UE leaves an uplink interference area. For example, after the UE measures quality (Mp) of the neighboring small cell, the UE determines whether the Mp meets the threshold of the event 1x; and if the Mp reaches the reporting threshold of the event 1x, the UE reports the event 1x for the neighboring small cell to the network-side device.

Likewise, after the UE measures quality (Mp) of the neighboring small cell, the UE determines whether the Mp meets the threshold of the event 1y; and if the Mp reaches the reporting threshold of the event 1y, reports the event 1y for the neighboring small cell to the network-side device.

Therefore, the receiving unit 810 may acquire the interference reporting event (event 1x or event 1y) for the neighboring small cell, and the processing unit 820 may perform, according to the event 1x or event 1y reported by the UE, control to reduce interference for the neighboring small cell. In this embodiment of the present invention, the control used to reduce interference for the neighboring small cell is the same as that in the prior art, and its description is omitted herein for avoiding repetition.

Optionally, in this embodiment of the present invention, the apparatus 800 further includes:

a sending unit 830, configured to send a fifth message to the user equipment, where the fifth message includes cell indication information used to indicate the target cell for which interference measurement reporting is performed, so that the user equipment determines, according to the cell indication information, the target cell for which interference measurement reporting needs to be performed.

The fifth message sent by the network-side device may be a measurement control message (Measurement Control message).

Specifically, for example, if a network side requires the UE to detect and report interference for a part of cells, the network-side device may further deliver an indication to the UE to determine a cell (a target cell) for which interference measurement reporting needs to be performed (an example of cell indication information), where the indication may be an indication added to a neighboring cell list, or a list added to a neighboring cell list, to indicate the cell for which interference measurement reporting needs to be performed. Therefore, the UE may only determine whether measured quality of the neighboring cell identified by the indication reaches a reporting threshold of an interference event.

Optionally, in this embodiment of the present invention, the cell indication information includes location information used to indicate a location of the target cell, or transmit power information used to indicate transmit power of the target cell, or time difference information used to indicate a time difference between the target cell and a cell in which the user equipment is currently located.

Specifically, in a communications system of the present invention, it may be required that time differences between small cells and a same macro cell should set to be different; the macro-cell network-side device may indicate the target small cell according to a time difference. Therefore, the UE may distinguish the target small cell according to time difference information indicating the time difference. Alternatively, measurement parameters of different small cells may be distinguished by using different location information or transmit power of the small cells. Herein, the location information of the small cell may be determined by determining detected signal quality of the macro cell, or determined by using GPS information. It should be understood that the foregoing exemplified parameters are only for exemplary description of the present invention, and the present invention is not limited thereto; other parameters that can uniquely indicate the target small cell all fall within the protection scope of the present invention.

Therefore, with the mobility control apparatus according to this embodiment of the present invention, a problem that a measurement parameter cannot be accurately applied due to reuse of a scrambling code can be avoided.

With the mobility control apparatus according to this embodiment of the present invention, by introducing the interference reporting event, the uplink interference can be detected before the UE enters the area in which the UE causes interference to the neighboring small cell, and subsequent interference control is started, which can avoid interference to the neighboring small cell.

The mobility control apparatus 800 according to this embodiment of the present invention may be corresponding to a network-side device in a method according to an embodiment of the present invention. In addition, the units and modules in the mobility control apparatus 800, and the foregoing other operations and/or functions separately implement the corresponding processes in the method 600 in FIG. 6. For brevity, no repetition is provided herein.

Another embodiment of the present invention further discloses a mobility control apparatus, including: a receiver, configured to receive a first message sent by a network-side device, and transmit first information, which is included in the first message and used to indicate a measurement parameter, to a processor, where the measurement parameter includes an extended-cell individual offset and/or a range extension, where the extended-cell individual offset is used for measurement reporting, a range of the extended-cell individual offset is greater than a range of a cell individual offset, and the range extension can be used for a cell reselection and measurement reporting; and the processor, configured to acquire the first information from the receiver, and determine the measurement parameter according to the first information, and configured to perform mobility control for the target cell according to measured quality of a target cell and the measurement parameter.

The mobility control apparatus further includes: a transmitter, configured to send a second message to the network-side device, where the second message includes second information used to indicate a measurement capability of a user equipment, so that the network-side device determines the measurement parameter according to the measurement capability of the user equipment.

The first message received by the receiver further includes cell indication information used to indicate the target cell; and the processor is further configured to determine the target cell according to the cell indication information; and configured to perform mobility control for the target cell according to the measured quality of the target cell and the measurement parameter.

The cell indication information includes location information used to indicate a location of the target cell, or transmit power information used to indicate transmit power of the target cell, or time difference information used to indicate a time difference between the target cell and a cell in which the user equipment is currently located.

The processor is specifically configured to determine a reporting event for the target cell according to the measured quality of the target cell and the measurement parameter, and transmit the third information indicating the reporting event, to the transmitter; and the mobility control apparatus further includes: the transmitter, configured to acquire the third information from the processor, and send a third message to the network-side device, where the third message includes the third information, so that the network-side device performs mobility control for the target cell according to the third information.

The processor is specifically configured to determine, if a sum of the measured quality of the target cell and the extended-cell individual offset reaches a reporting threshold of an event 1a, that the reporting event is the event 1a; or determine, if a sum of the measured quality of the target cell, the extended-cell individual offset, and the range extension reaches the reporting threshold of the event 1a, that the reporting event is the event 1a.

The processor is specifically configured to determine, if a sum of the measured quality of the target cell and the extended-cell individual offset reaches a reporting threshold of an event 1b, that the reporting event is the event 1b; or determine, if a sum of the measured quality of the target cell, the extended-cell individual offset, and the range extension reaches the reporting threshold of the event 1b, that the reporting event is the event 1b.

The processor is specifically configured to determine, if a sum of the measured quality of the target cell and the range extension reaches a reporting threshold of 1d, that the reporting event is the event 1d.

The processor is specifically configured to determine an interference reporting event for the target cell according to the measured quality of the target cell and the measurement parameter, where the interference reporting event is used for the network-side device to perform interference control for the target cell.

The first message received by the receiver further includes a first identifier, where the first identifier is used to indicate that the measurement parameter is used to determine the interference reporting event. The processor is specifically configured to determine the interference reporting event according to the first identifier, the measured quality of the target cell, and the measurement parameter.

The third message sent by the transmitter further includes a second identifier, where the second identifier is used to indicate that the reporting event is the interference reporting event, so that the network-side device performs interference control for the target cell according to the second identifier and the reporting event.

Another embodiment of the present invention further discloses a mobility control apparatus, including: a processor, configured to determine a measurement parameter, and transmit first information used to indicate the measurement parameter, to a transmitter, where the measurement parameter includes an extended-cell individual offset and/or a range extension, where the extended-cell individual offset is used for measurement reporting, a range of the extended-cell individual offset is greater than a range of a cell individual offset, and the range extension can be used for a cell reselection and measurement reporting; and the transmitter, configured to send a first message to a user equipment, where the first message includes the first information, so that the user equipment performs mobility control for the target cell according to measured quality of a target cell and the measurement parameter.

The mobility control apparatus further includes: a receiver, configured to receive a second message sent by the user equipment, where the second message includes second information used to indicate a measurement capability of the user equipment, and transmit the second information to the processor; and the processor is further configured to determine the measurement parameter according to the measurement capability of the user equipment.

The processor is specifically configured to determine, according to the target cell, a measurement parameter corresponding to the target cell; and the transmitter is specifically configured to send the first message to the user equipment, where the first message further includes cell indication information used to indicate the target cell, so that the user equipment determines the target cell according to the cell indication information.

The cell indication information includes location information used to indicate a location of the target cell, or transmit power information used to indicate transmit power of the target cell, or time difference information used to indicate a time difference between the target cell and a cell in which the user equipment is currently located.

The mobility control apparatus further includes: a receiver, configured to receive a third message, which is sent by the user equipment and includes third information, where the third information is used to indicate a reporting event for the target cell, where the reporting event is determined by the user equipment according to the measured quality of the target cell and the measurement parameter, and transmit the third information to the processor; and the processor is specifically configured to perform mobility control for the target cell according to the reporting event.

The processor is specifically configured to perform interference control for the target cell according to an interference reporting event included in the reporting event.

The transmitter is specifically configured to send the first message to the user equipment, where the first message further includes a first identifier, where the first identifier is used to indicate that the measurement parameter is used to determine the interference reporting event; the receiver is further configured to receive the third message, which is sent by the user equipment and includes the third information, where the third information is used to indicate the interference reporting event; and the processor is further configured to perform interference control for the target cell according to the interference reporting event.

The receiver is further configured to receive the third message, which is sent by the user equipment and includes the third information, where the third message further includes a second identifier, where the second identifier is used to indicate that the reporting event is the interference reporting event; and the processor is further configured to determine, according to the second identifier, that the reporting event is the interference reporting event; and configured to perform interference control for the target cell according to the interference reporting event.

Another embodiment of the present invention further discloses a mobility control apparatus, including: a processor, configured to cause a user equipment to determine, according to measured quality of a target cell, an interference reporting event for the target cell, and transmit information indicating the interference reporting event, to a transmitter, where the interference reporting event includes a first interference event used to indicate that the user equipment enters an area in which the user equipment causes interference to the target cell or a second interference reporting event used to indicate that the user equipment leaves an area in which the user equipment causes interference to the target cell; and the transmitter, configured to acquire the information indicating the interference reporting event, from the processor, and send a fourth message to the network-side device, where the fourth message includes fourth information used to indicate the interference reporting event.

The mobility control apparatus further includes: a receiver, configured to receive a fifth message sent by the network-side device, where the fifth message includes cell indication information used to indicate the target cell for which interference measurement reporting is performed, and transmit the cell indication information to the processor; and the processor is further configured to acquire the cell indication information from the receiver, and determine, according to the cell indication information, the target cell for which interference measurement reporting needs to be performed.

The processor is specifically configured to determine, according to measured quality of a first target cell, a first interference reporting event for the first target cell; and configured to record the first target cell, and determine a second interference reporting event for the first target cell only according to the measured quality of the first target cell.

Another embodiment of the present invention further discloses a mobility control apparatus, including: a receiver, configured to receive a fourth message, which is sent by a user equipment and includes fourth information, where the fourth information is used to indicate an interference reporting event for a target cell, and transmit the information indicating the interference reporting event, to a processor, where the interference reporting event includes a first interference event used to indicate that the user equipment enters an area in which the user equipment causes interference to the target cell or a second interference reporting event used to indicate that the user equipment leaves an area in which the user equipment causes interference to the target cell; and the processor, configured to acquire the information indicating the interference reporting event, from the receiver, and perform interference control for the target cell according to the interference reporting event.

The mobility control apparatus further includes: a transmitter, configured to send a fifth message to the user equipment, where the fifth message includes cell indication information used to indicate the target cell for which interference measurement reporting is performed, so that the user equipment determines, according to the cell indication information, the target cell for which interference measurement reporting needs to be performed.

The process of performing control by the network-side device of a macro network according to the interference reporting event for the neighboring cell is exemplified above. It should be understood that the present invention is not limited thereto. A process of performing control by the network-side device of a small network according to the interference reporting event for the neighboring cell is similar to the foregoing process, and its description is omitted herein for avoiding repetition.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for mobility control, the method comprising:
   receiving a first message sent by a network-side device, wherein the first message comprises first information used to indicate a measurement parameter, wherein the measurement parameter comprises an extended-cell individual offset, wherein the extended-cell individual offset is used for measurement reporting, a range of the extended-cell individual offset is greater than a range of a cell individual offset;
   determining the measurement parameter according to the first information; and
   performing mobility control for a target cell according to a measured quality of the target cell and the measurement parameter, wherein performing the mobility control for the target cell according to the measured quality of the target cell and the measurement parameter, comprises:
   determining a reporting event for the target cell according to the measured quality of the target cell and the measurement parameter, and
   sending a third message to the network-side device, wherein the third message comprises third information used to indicate the reporting event.

2. The method according to claim 1, wherein before the first information sent by the network-side device is received, the method further comprises:
   sending a second message to the network-side device, wherein the second message comprises second information used to indicate a measurement capability of a user equipment, so that the network-side device determines the measurement parameter according to the measurement capability of the user equipment.

3. The method according to claim 1, wherein the first message further comprises cell indication information used to indicate the target cell, and wherein performing the mobility control for the target cell according to the measured quality of the target cell and the measurement parameter comprises:
   determining the target cell according to the cell indication information; and
   performing mobility control for the target cell according to the measured quality of the target cell and the measurement parameter.

4. The method according to claim 3, wherein the cell indication information comprises location information used to indicate a location of the target cell, or transmit power information used to indicate transmit power of the target cell, or time difference information used to indicate a time difference between the target cell and a cell in which a user equipment is currently located.

5. The method according to claim 1, wherein the determining of the reporting event comprises determining an interference reporting event for the target cell according to the measured quality of the target cell and the measurement parameter, so that the network-side device performs interference control for the target cell according to the interference reporting event.

6. The method according to claim 1, wherein performing the mobility control for the target cell according to the measured quality of the target cell and the measurement parameter comprises:
   determining an interference reporting event for the target cell according to the measured quality of the target cell and the measurement parameter, so that the network-side device performs interference control for the target cell according to the interference reporting event.

7. The method according to claim 1, wherein the measurement parameter comprises a range extension, and wherein the range extension is configured to be used for a cell reselection and measurement reporting.

8. A mobility control apparatus comprising:
   a receiver configured to receive a first message sent by a network-side device, and transmit first information, which is comprised in the first message and used to indicate a measurement parameter, to a processor, wherein the measurement parameter comprises an extended-cell individual offset, wherein the extended-cell individual offset is used for measurement reporting, wherein a range of the extended-cell individual offset is greater than a range of a cell individual offset;
   a memory storing a program to be executed in the processor, the program comprising instructions for:
   determining the measurement parameter according to the first information;
   performing mobility control for a target cell according to a measured quality of the target cell and the measurement parameter; and
   determining a reporting event for the target cell according to the measured quality of the target cell and the measurement parameter, and transmitting third information indicating the reporting event to a transmitter; and wherein the transmitter is further configured to acquire the third information from the processor, and send a third message to the network-side device, wherein the third message comprises the third information, so that the network-side device performs mobility control for the target cell according to the third information.

9. The apparatus according to claim 8, wherein the apparatus further comprises:
a transmitter configured to send a second message to the network-side device, wherein the second message comprises second information used to indicate a measurement capability of a user equipment, so that the network-side device determines the measurement parameter according to the measurement capability of the user equipment.

10. The apparatus according to claim 8, wherein: the first message received by the receiver further comprises cell indication information used to indicate the target cell; and
the program further includes instructions for
determining the target cell according to the cell indication information; and
performing mobility control for the target cell according to the measured quality of the target cell and the measurement parameter.

11. The apparatus according to claim 10, wherein the cell indication information comprises location information used to indicate a location of the target cell, or transmit power information used to indicate transmit power of the target cell, or time difference information used to indicate a time difference between the target cell and a cell in which a user equipment is currently located.

12. The apparatus according to claim 8, wherein the program further includes instructions for:
determining, if a sum of the measured quality of the target cell and the extended-cell individual offset reaches a reporting threshold of an event 1a, that the reporting event is the event 1a; or
determining, if a sum of the measured quality of the target cell, the extended-cell individual offset, and the range extension reaches a reporting threshold of the event 1a, that the reporting event is the event 1a.

13. The apparatus according to claim 8, wherein the program further includes instructions for:
determining, if a sum of the measured quality of the target cell and the extended-cell individual offset reaches a reporting threshold of an event 1b, that the reporting event is the event 1b; or
determining, if a sum of the measured quality of the target cell, the extended-cell individual offset, and the range extension reaches a reporting threshold of the event 1b, that the reporting event is the event 1b.

14. The apparatus according to claim 8, wherein the program further includes instructions for determining, if a sum of the measured quality of the target cell and the range extension reaches a reporting threshold of an event 1d, that the reporting event is the event 1d.

15. The apparatus according to claim 8, wherein the program further includes instructions for determining an interference reporting event for the target cell according to the measured quality of the target cell and the measurement parameter, wherein the interference reporting event is used for the network-side device to perform interference control for the target cell.

16. The apparatus according to claim 15, wherein:
the first message received by the receiver further comprises a first identifier, wherein the first identifier is used to indicate that the measurement parameter is used to determine the interference reporting event; and
the program further includes instructions for determining the interference reporting event according to the first identifier, the measured quality of the target cell, and the measurement parameter.

17. The apparatus according to claim 15, wherein the third message sent by the transmitter further comprises a second identifier, wherein the second identifier is used to indicate that the reporting event is the interference reporting event, so that the network-side device performs interference control for the target cell according to the second identifier and the reporting event.

18. The apparatus according to claim 8, wherein the measurement parameter further comprises a range extension, and wherein the range extension is used for a cell reselection and measurement reporting.

19. A mobility control apparatus comprising:
a processor;
a memory storing a program to be executed in the processor, the program comprising instructions for:
determining a measurement parameter, and transmitting first information used to indicate the measurement parameter, to a transmitter, wherein the measurement parameter comprises an extended-cell individual offset, wherein the extended-cell individual offset is used for measurement reporting, a range of the extended-cell individual offset is greater than a range of a cell individual offset; and
wherein the transmitter is configured to send a first message to a user equipment, wherein the first message comprises the first information, so that the user equipment performs mobility control for a target cell according to a measured quality of the target cell and the measurement parameter;
a receiver configured to receive a second message sent by the user equipment, wherein the second message comprises second information used to indicate a measurement capability of the user equipment, and transmit the second information to the processor;
wherein the receiver is further configured to receive third information indicating a reporting event for the target cell according to the measured quality of the target cell and the measurement parameter, wherein the third message comprises the third information so that the network-side device performs mobility control for the target cell according to the third information.

20. The apparatus according to claim 19,
wherein the program further includes instructions for determining the measurement parameter according to the measurement capability of the user equipment.

21. The apparatus according to claim 19, wherein:
the, program further includes instructions for determining according to the target cell, a measurement parameter corresponding to the target cell; and
the transmitter is specifically configured to send the first message to the user equipment, wherein the first message further comprises cell indication information used to indicate the target cell, so that the user equipment determines the target cell according to the cell indication information.

22. The apparatus according to claim 19, wherein the measurement parameter further comprises a range extension, and wherein the range extension is configured to be used for a cell reselection and measurement reporting.

* * * * *